(12) United States Patent
Hu et al.

(10) Patent No.: US 12,455,769 B2
(45) Date of Patent: Oct. 28, 2025

(54) INTELLIGENT OUTAGE EVALUATION AND INSIGHT MANAGEMENT FOR MONITORING AND INCIDENT MANAGEMENT SYSTEMS

(71) Applicant: Microsoft Technology Licensing, LLC, Redmond, WA (US)

(72) Inventors: Bing Hu, Issaquah, WA (US); Zhangwei Xu, Redmond, WA (US); Vincent Joseph Blas, Edmonds, WA (US); Peiling Wu, Redmond, WA (US); Chaturanan Damodar Mishra, Bothell, WA (US); Igor Figlin, Redmond, WA (US); Robert Gerard Boyce, Seattle, WA (US); Anupama Vedapuri, Redmond, WA (US); Oren Rosenbloom, Redmond, WA (US); Nicholas Anthony Swanson, Woodinville, WA (US); Murali Chintalapati, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1039 days.

(21) Appl. No.: 17/510,213

(22) Filed: Oct. 25, 2021

(65) Prior Publication Data

US 2023/0128837 A1    Apr. 27, 2023

(51) Int. Cl.
*G06F 9/46* (2006.01)
*G06F 9/48* (2006.01)
*G06F 9/50* (2006.01)

(52) U.S. Cl.
CPC .......... *G06F 9/5005* (2013.01); *G06F 9/4812* (2013.01)

(58) Field of Classification Search
CPC ............................ G06F 9/5005; G06F 9/4812
See application file for complete search history.

(56) References Cited

U.S. PATENT DOCUMENTS

| 7,464,119 B1 | 12/2008 | Akram et al. |
| 2017/0103330 A1 | 4/2017 | Gagne et al. |
| (Continued) | | |

OTHER PUBLICATIONS

"International Search Report and Written Opinion Issued in PCT Application No. PCT/US22/038605", Mailed Date: Oct. 28, 2022, 13 Pages.

(Continued)

*Primary Examiner* — Tammy E Lee
(74) *Attorney, Agent, or Firm* — Newport IP, LLC; Jacob P. Rohwer

(57) ABSTRACT

Systems, methods, and devices are described for intelligent outage evaluation and insight management for monitoring and incident management systems. A set of incident logs associated with a cloud computing service are received by a cloud computing service provider system. Each incident log includes impact data corresponding to a respective incident that occurred during an evaluation period. The impact data includes an interruption count representative of a number of interruptions on resources caused by the respective incident. A total active resource time representative of resource activity during the evaluation period is determined. An interruption rate is determined for the evaluation period by summing interruption counts to generate a total interruption count and dividing the total interruption count by the total active resource time. An actionable insight applicable to the cloud computing service is generated based on the interruption rate and the incident logs.

13 Claims, 13 Drawing Sheets

(56) References Cited

U.S. PATENT DOCUMENTS

| | | | |
|---|---|---|---|
| 2017/0132057 A1 | 5/2017 | Zhang et al. | |
| 2017/0344277 A1* | 11/2017 | Gilboa | G06F 13/24 |
| 2019/0383866 A1* | 12/2019 | Stenberg | G01R 22/068 |
| 2022/0021721 A1* | 1/2022 | Liu | H04L 65/612 |
| 2022/0129322 A1* | 4/2022 | Schwartz | G06F 9/5038 |

OTHER PUBLICATIONS

Pandey, et al., "Annual Interruption Rate as a KPI, its Measurement and Comparison", In Repository of arXiv:1910.12200v1, Oct. 27, 2019, 27 Pages.

* cited by examiner

300

```
┌─────────────────────────────────────────────────────────────────┐
│ Receive a set of incident logs associated with a cloud computing service, each  │──302
│ incident log of the set of incident logs including impact data corresponding to │
│ a respective incident that occurred during an evaluation period, the impact     │
│ data including an interruption count representative of a number of              │
│ interruptions on resources caused by the respective incident                    │
└─────────────────────────────────────────────────────────────────┘
                                    ↓
┌─────────────────────────────────────────────────────────────────┐
│ Determine a total active resource time respective of resource activity during   │──304
│ the evaluation period                                                           │
└─────────────────────────────────────────────────────────────────┘
                                    ↓
┌─────────────────────────────────────────────────────────────────┐
│ Determine an interruption rate for the evaluation period by generating a total  │──306
│ interruption count by summing interruption counts of the set of incident logs,  │
│ and dividing the total interruption count by the total active resource time     │
└─────────────────────────────────────────────────────────────────┘
                                    ↓
┌─────────────────────────────────────────────────────────────────┐
│ Determine an interruption duration rate for the evaluation period by generating │──308
│ a total interruption duration by summing interruption durations of the set of   │
│ incident reports, and dividing the total interruption duration by the total active │
│ resource time                                                                   │
└─────────────────────────────────────────────────────────────────┘
                                    ↓
┌─────────────────────────────────────────────────────────────────┐
│ Generate one or more actionable insights applicable to the cloud computing      │──310
│ service based on the interruption rate and the incident logs                    │
└─────────────────────────────────────────────────────────────────┘
                                    ↓
┌─────────────────────────────────────────────────────────────────┐
│ Display a graphical indication associated with the one or more actionable       │──318
│ insights in a user interface                                                    │
└─────────────────────────────────────────────────────────────────┘
```

```
┌─────────────────────────────────────────────────────────────────┐
│ Analyze the interruption rate and the set of incident logs to attribute the     │──312
│ interruption rate to at least one root cause and/or responsible service         │
└─────────────────────────────────────────────────────────────────┘
                                    ↓
┌─────────────────────────────────────────────────────────────────┐
│ Assign management of the interruption rate to the at least one responsible      │──314
│ service                                                                         │
└─────────────────────────────────────────────────────────────────┘
                                    ↓
┌─────────────────────────────────────────────────────────────────┐
│ Determine one or more actionable insights based on the analysis of the          │──316
│ interruption rate and/or the assignment of management of the interruption       │
│ rate                                                                            │
└─────────────────────────────────────────────────────────────────┘
```

FIG. 3B

| | Day 1 | Day 2 | Day 3 | Day 4 | Day 5 | Day 6 | |
|---|---|---|---|---|---|---|---|
| Resource 1 | | Incident | | | | Incident | |
| Resource 2 | | Incident | Incident | | | Incident | |
| Resource 3 | | | Incident | | | Incident | |
| Resource 4 | | | Incident | | Incident | Incident | |
| Resource 5 | | Incident | Incident | | | Incident | |
| Resource 6 | | | Incident | | | Incident | |
| ⋮ | ⋮ | ⋮ | ⋮ | ⋮ | ⋮ | ⋮ | ⋮ |
| Resource N | | Incident | | | | Incident | |
| | | Outage 1 | Outage 2 | | Outage 3 | Outage 4 | |
| TTM | | 392 | 70 | | 39 | 18 | Avg. |
| Resources Imp. | | 4 | 5 | | 1 | 7 | |
| AIR-O | 0.00 | 1.27 | 1.59 | 0.00 | 0.32 | 2.22 | 0.90 |
| AIR-OD | 0.0 | 497.7 | 111.1 | 0.0 | 12.4 | 40.0 | 110.2 |

Total Active Resources: 1,150

INTELLIGENT OUTAGE EVALUATION AND INSIGHT MANAGEMENT FOR MONITORING AND INCIDENT MANAGEMENT SYSTEMS

BACKGROUND

Applications, resources, and data may be accessible to computers over one or more networks at one or more servers. Storage devices at such servers may be referred to as "network-based storage," and the servers may be referred to as "network-based servers." "Cloud storage" (also known as "cloud-based storage) is a form of network-based storage where data can be stored at and be accessed from remote devices via the Internet. "Cloud computing" refers to the on-demand availability of computer system resources (e.g., applications, services, processors, storage devices, file systems, and databases) over the Internet and data stored in cloud storage. Servers hosting cloud-based resources may be referred to as "cloud-based servers" (or "cloud servers"). A "cloud computing service" refers to an administrative service (implemented in hardware that executes in software and/or firmware) that manages a set of cloud computing computer system resources.

A cloud computing service may include a monitoring system configured to monitor resources of the cloud computing service for proper operation. A monitoring system may include appropriate monitors configured to evaluate and report service issues that may arise. The monitoring system may be used to evaluate the reliability of the cloud computing service, for example, by counting outage occurrences.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, processing systems, and apparatuses are described for intelligent outage evaluation and insight management, substantially as shown in and/or described herein. In one aspect, a set of incident logs associated with a cloud computing service are received by a cloud computing service provider system. Each incident log includes impact data corresponding to a respective incident that occurred during an evaluation period. The impact data includes an interruption count representative of a number of interruptions on resources caused by the respective incident. A total active resource time representative of resource activity during the evaluation period is determined. An interruption rate is determined for the evaluation period by generating a total interruption count by summing interruption counts and dividing the total interruption count by the total active resource time. One or more actionable insights applicable to the cloud computing service are generated based on the interruption rate and the incident logs.

In a further example aspect, impact data may include an interruption duration representative of a length of interruptions on resources caused by a respective incident. An interruption duration rate may be determined by generating a total interruption duration by summing interruption durations of the set of incident logs and dividing the total interruption duration by the total active resource time.

Further features and advantages, as well as structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 3A is a flowchart providing a process for intelligent outage evaluation and insight management, according to an example embodiment.

FIG. 3B is a flowchart providing a process for generating actionable insights, according to an example embodiment.

Figure 1:
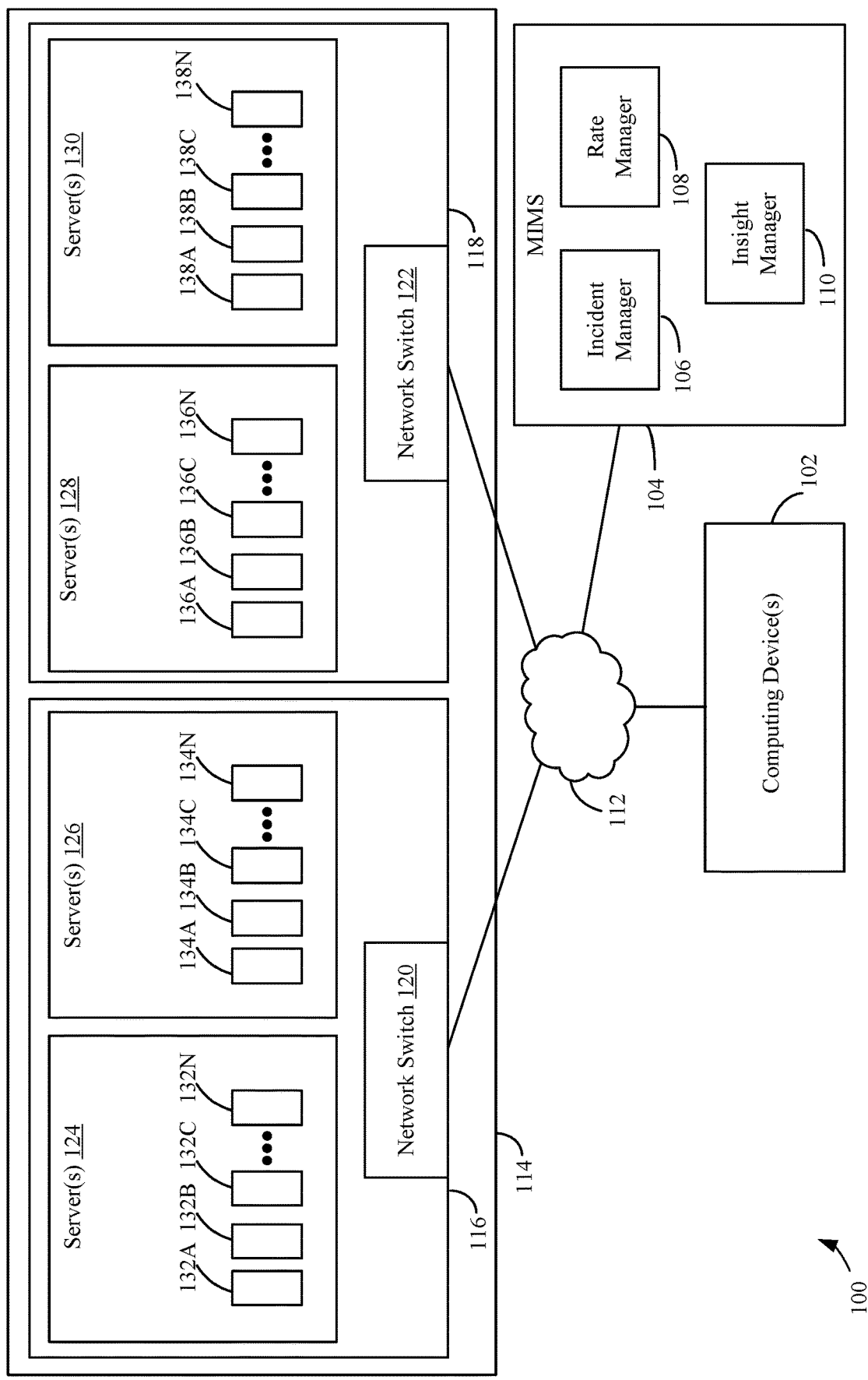
FIG. 1 is a block diagram of a network service system configured for intelligent outage evaluation and insight management, according to an example embodiment.

Embodiments will now be described with reference to the accompanying drawings. In the drawings, the left-most digit(s) of a reference number identifies the drawing in which the reference number first appears.

DETAILED DESCRIPTION

I. Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Note that the variable "N" is appended to various reference numerals in several drawings/figures identifying illustrated components to indicate that the number of such components is variable, for example, with any value of 2 and greater. Note that for each distinct component/reference numeral, the variable "N" has a corresponding value, which may be different for the value of "N" for other components/reference numerals. The value of "N" for any particular component/reference numeral may be less than 10, in the 10s, in the hundreds, in the thousands, or even greater, depending on the particular implementation.

It should be noted that the drawings/figures are not drawn to scale unless otherwise noted herein.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner. That is, the embodiments described herein are not mutually exclusive of each other and may be practiced and/or implemented alone, or in any combination.

II. Example Monitoring and Incident Management System Embodiments

A cloud computing service may include a monitoring system configured to monitor resources of the cloud computing service for proper operation. A monitoring system may include appropriate monitors configured to evaluate and report service issues that may arise. The monitoring system may be used to evaluate the reliability of the cloud computing service, for example, by counting outage occurrences or measuring time-to-mitigate (TTM). In such solutions, however, each outage is treated the same in terms of customer impact. For example, an outage impacting one virtual machine is treated the same as an outage impacting 10,000 virtual machines. For similar reasons, such metrics do not provide a measure of service quality, as a higher number of outages does not necessarily indicate a lower level of service quality. Additionally, outage count and TTM are not normalized, so segments cannot be readily compared.

The example techniques and embodiments described herein provide for methods, systems, and apparatuses for intelligent outage evaluation and insight management for a monitoring and incident management system (MIMS). Such a system may detect and/or analyze anomalous activity. In this context, anomalous activity is activity associated with a cloud computing service that deviates from standard behavior, and thus may be associated with improper operation, including degradation or complete failure, in a system and/or service of the cloud computing service. An incident is anomalous activity (represented by captured data) outside of a predetermined limit. If an incident has an impact that meets or exceeds a predetermined threshold (e.g., a performance threshold), such incident is considered an outage. An outage may have one or more incidents attributed to it. An outage is representative of a degradation (e.g., performance below a threshold) or a complete failure in system and/or service performance.

For instance, in an embodiment, a MIMS of a cloud computing service receives information through a communication channel indicating an anomalous activity has impacted one or more resources of the cloud computing service. In this context, the MIMS may evaluate sets of information to determine an interruption rate and/or interruption duration rate due to outages for a set of resources (e.g., resources linked to a customer, region, subscription, fleet, offering, and/or datacenter). Interruptions may indicate a count of resources impacted by an outage and/or a contiguous period of time a resource is impacted by an incident, depending on the particular implementation. Focused interruption rates and interruption duration rates may be determined for any one or more selected segments of the resources, including segments selected according to any suitable temporal factors, spatial factors, and/or logical factors, for example. A determined interruption rate and/or interruption duration rate may be used to remediate issues associated with the affected resources. Since interruption rates and interruption duration rates are normalized across different segments, interruption rates and interruption duration rates for different segments may be compared directly in order to identify hot spots, trends, contributing factors, and/or other related information, as described elsewhere herein or otherwise known.

Embodiments of MIMS may be configured to determine an interruption rate and interruption duration rate based on a temporal resolution (e.g., hourly, daily, monthly) and scale the interruption rate and interruption duration rate to a scaled interruption rate and a scaled interruption duration rate, respectively. In this context, interruption rates and interruption duration rates are scaled by multiplying the respective rate by a scaling factor. In embodiments, the scaling factor represents a conversion factor (i.e., a ratio of a scaled period in the units of the evaluation period to the scaled period in the units desired). In an example, the evaluation period is a 24-hour period (i.e., one day), and the scaled period is a year, which would provide a scaling factor of 365. In this context, the MIMS may be configured to determine an annual interruption rate due to outages ("AIR-O" herein) and an annual interruption duration rate due to outages ("AIR-OD" herein). In embodiments, the scaling factor may be changed dynamically according to changes in lengths of evaluation periods and/or scaled periods. In embodiments, a MIMS may be further configured to determine a time-average of the scaled interruption rate and/or scaled interruption duration rate over several evaluation periods. In this context, the time-average of the scaled interruption rate can be considered the representative or effective interruption rate during the scaled period and the time-average of the scaled interruption duration rate can be considered the representative or effective interruption duration rate during the scaled period.

In accordance with an embodiment, a MIMS of a cloud computing service receives information through a communication channel from a variety of data sources. Such data sources may include cloud-service metered usage, telemetry, incident workflows (e.g., impact analysis, incident correlation, and communication with respect to incidents), and/or the like, for example. Data sources log outage information (e.g., an outage signal) generated at various checkpoints during an outage lifecycle. For instance, checkpoints during an outage lifecycle may include a normal running state of a resource, the rise of anomalous activity, the detection of an incident, triage and diagnosis of an incident, communication of an outage, mitigation of an outage, and/or post-outage review, for example.

The example techniques and embodiments described herein may be adapted to various types of systems for monitoring outage impacts on resources. For instance, a cloud computing service may include one or more MIMSs. The cloud computing service may include multiple resources (e.g., websites, virtual machines, subnets, cloud regions, nodes, web applications, databases, and servers), which may be represented by physical hardware devices, software applications, cloud storage, and/or the like. All or a portion of the cloud computing service resources may be impacted by an outage. The interruption rates and interruption duration rates determined by a MIMS account for the number of interruptions or interruption duration as well as the total number of active resources to indicate customer impact and/or service quality. Outages may be caused by various factors, such as power failures, communication interferences, bugs or errors in program code, and/or the like, as described elsewhere herein or otherwise known. Either users, resources, or a MIMS may detect and store information regarding an incident related to the outage as an incident log.

Moreover, the techniques and embodiments described herein may be adapted to systems for monitoring outage impacts on any type of resources. For instance, interruption rates and interruption duration rates may be determined for any segment of resources. Interruption rates and interruption duration rates may be determined for any type or group of resources.

The example techniques and embodiments described herein may be configured to evaluate interruption rates and/or interruption duration rates to determine actionable insights based on the evaluation. An actionable insight is information associated with a degradation and/or failure in the cloud computing service usable to identify corrective action. Actionable insights may indicate hot spots, commonly responsible services, commonly impacted resources, regions most impacted by outages, most common root causes, most impacted customers, most severe incidents, and/or the like. In this context, insight manager 110 may be further configured to generate an actionable insight report including the determined actionable insights. Actionable insights may be used to implement, deploy, and/or enforce a corrective action in the cloud computing service system. Corrective actions may include: one or more repairs (which may be prioritized), a repair request/agenda for performance upon one or more resources; customer outreach; a technique for reducing repeat failures; an indication of potential areas of investment in systems/services; a re-establishment of baseline provisions; actions to improve reliability in one or more resources; software update release workflow improvements; error budget management; improving code quality; improving customer experience and satisfaction; assigning accountability; ranking root causes; and/or the like. The corrective actions may be manually implemented by a user (e.g., a system administrator) and/or automatically (e.g., by a computing device).

For instance, in accordance with an embodiment, a MIMS of a cloud computing service attributes an interruption rates and interruption duration rate to a root cause and responsible party. In this context, this attribution is used to generate an actionable insight for the cloud service provider to implement corrective actions such as assigning accountability, improving service quality, and improving customer experience.

In accordance with an embodiment, actionable insights are displayed in a reporting dashboard. For instance, a reporting dashboard may be implemented as a GUI that includes various input controls (e.g., text-based inputs, check boxes, radio buttons, or drop-down menus) and output controls (e.g., tables, graphs, text windows, or graphics). A cloud service provider may use the reporting dashboard to evaluate quality progress, evaluate interruption rates and/or interruption duration rates, evaluate impact to customers (e.g., evaluate a customer's pain), evaluate actionable insights, and/or implement, enforce, and/or enforce one or more corrective actions in a cloud computing service system.

In an embodiment, to provide relevant information to a service team or user, a MIMS may be configured to define and store incident logs based on various identifiers (IDs) related to the incident (e.g., Resource IDs, Customer IDs, Region IDs, Incident IDs, Tracking IDs, Communication IDs, Subscription IDs, Detection Monitor IDs, Responsible Service IDs, fleet IDs, Root Cause IDs, Cluster IDs, and date of occurrence). The MIMS may be configured to correlate incident logs based on the various IDs to generate a set of information pertaining to a particular offering, outage, region (e.g., city, state, territory, province, country, continent, and/or groupings or subdivisions thereof), customer, and/or fleet. An offering may indicate a type of resource. Each offering or resource may include one or more resource units. A resource unit is a unit of resource that a customer uses or pays for, such as a virtual machine, a website, a database, a server, and/or the like.

Intelligent outage evaluation and insight management may be implemented in various manners, in embodiments. For example, FIG. 1 is a block diagram of a network-based system 100 ("system 100" herein) configured for intelligent outage evaluation and insight management, according to an example embodiment. As shown in FIG. 1, system 100 includes a plurality of resource sets 116 and 118, one or more computing devices 102, and one or more instances of a MIMS 104. Resource sets 116 and 118 (and any number of additional resource sets) define a network-accessible server infrastructure 114. In the example of FIG. 1, resource set 116 includes a network switch 120, one or more servers 124, and one or more servers 126, and resource set 118 includes a network switch 122, one or more servers 128, and one or more servers 130. Resource sets 116 and 118, computing device(s) 102, and MIMS 104 are communicatively coupled via network 112. Each MIMS 104 is configured to intelligently evaluate outages and manage insights for system 100. As shown in FIG. 1, MIMS 104 includes an incident manager 106, a rate manger 108, and an insight manager 110. Furthermore, any number of MIMS(s) 104 may be present, such as one or more per resource set, and/or one or more per resource. Network 112 may comprise one or more networks such as local area networks (LANs), wide area networks (WANs), enterprise networks, the Internet, etc., and may include one or more of wired and/or wireless portions. In an embodiment, resource sets 116 and 118, computing device(s) 102, and MIMS(s) 104 communicate via one or more application programming interfaces (API).

Resource sets 116 and 118 may form a network-accessible server set, such as a cloud computing service network, which defines a network-accessible server infrastructure 114. For example, resource sets 116 and 118 comprise servers 124 and 126 and servers 128 and 130, respectively, that are each accessible by a network such as the Internet (e.g., in a "cloud-based" embodiment) to store, manage, and process data. Each of resource sets 116 and 118 may comprise any number of servers and may include any type and number of other resources. Servers of a resource set may be organized in any manner, including being grouped in server racks (e.g., 8-40 servers per rack, referred to as nodes or "blade servers"), server clusters (e.g., 2-64 servers, 4-8 racks, or other numbers of servers and/or racks), or datacenters (e.g., thousands of servers, hundreds of racks, and/or dozens of clusters). In an embodiment, the servers of a resource set are co-located (e.g., housed in one or more nearby buildings with associated components such as backup power supplies, redundant data communications, and environmental controls) to form a datacenter, or may be arranged in other manners. Accordingly, in an embodiment, resource sets 116 and 118 are each a datacenter in a distributed collection of datacenters. In this context, network-accessible server infrastructure 114 may be distributed across one or more regions.

In accordance with such an embodiment, each of resource sets 116 and 118 may be configured to service a particular geographical region. For example, resource set 116 may be configured to service the northeastern region of the United States, and resource set 118 may be configured to service the southwestern region of the United States. It is noted that the network-accessible server set may include any number of resource sets, and each resource set may service any number of geographical regions worldwide.

Each of server(s) 124, 126, 128, 130 may be configured to execute one or more services (including microservices), applications, and/or supporting services. As shown in FIG. 1, server(s) 124, 126, 128, 130 may each be configured to execute supporting services. A "supporting service" is a cloud computing service/application configured to manage a set of servers (e.g., a cluster of servers in resource set 116) to operate as network-accessible (e.g., cloud-based) computing resources for users. Examples of supporting services include Microsoft R Azure R, Amazon Web Services R, Google Cloud Platform™, IBM Cloud R), etc. A supporting service may be configured to build, deploy, and manage applications and services on the corresponding set of servers. Each instance of the supporting service may implement and/or manage a set of focused and distinct features or functions on the corresponding server set, including virtual machines, operating systems, application services, storage services, database services, messaging services, and/or the like. Supporting services may be coded in any programming language. Each of server(s) 124, 126, 128, 130 may be configured to execute any number of supporting services (e.g., supporting services 132A-132N, 134A-134N, 136A-136N, 138A-138N, respectively), including multiple instances of the same and/or different supporting services.

Note that MIMS 104 may be an example of a supporting service implemented in one or more of server(s) 124, 126, 128, 130.

Computing device(s) 102 includes the computing devices of users (e.g., individual users, family users, enterprise users, or governmental users) that may be tenants and/or that otherwise access network-accessible resource sets 116 and 118 for computing resources over network 112. Computing device(s) 102 may include any number of computing devices, including ones, tens, hundreds, thousands, millions, or even greater numbers of computing devices. Computing devices of computing device(s) 102 may each be any type of stationary or mobile computing device, including mobile computing device (e.g., a Microsoft R SurfaceR device, a personal digital assistant (PDA), a laptop computer, a notebook computer, a tablet computer such as an Apple iPad™, a netbook, and/or the like), a mobile phone, a wearable computing device, or other type of mobile device, or a stationary computing device such as a desktop computer or a server. Computing device(s) 102 may each interface with servers of server(s) 124, 126, 128, 130 through application programming interfaces (APIs) and/or by other mechanisms. Note that any number of program interfaces may be present. Computing device(s) 102 may also include one or more logical computing devices (e.g., virtual machines).

As described above, MIMS 104 is configured to intelligently evaluate outages and manage insights for system 100. MIMS 104 may be incorporated in any type of computing device(s) described elsewhere herein or otherwise known. For instance, MIMS(s) 104 may be incorporated in a network/cloud supporting service mentioned elsewhere herein or otherwise known.

Incident manager 106 is configured to monitor information from servers 124, 126, 128, 130, resource sets 116, 118, and/or computing device(s) 102 over a period of time. This information may include telemetric data (e.g., resource performance, resource failures, resource degradation, temperature, pressure, validation, and/or resource coverage), requests (e.g., for historical data, for outage updates, and/or for resource usage), notifications (e.g., user generated reports and/or server-side detections), and/or the like. Incident manager 106 is configured to detect anomalous activity based on the information and to determine if the anomalous activity indicates an incident. If an incident is determined to be of sufficient customer impact, the incident is classified as an outage. If the anomalous activity is determined to be an incident, incident manager 106 logs the incident as an incident log (e.g., an outage log) in a data storage. Incidents logged in this way may be considered as an interruption. The interruption indicates a resource (e.g., a server of server(s) 124, 126, 128, and/or 130) has been impacted by an outage for a period of time.

Rate manager 108 is configured to correlate individual incident logs logged by incident manager 106. For instance, rate manager 108 may be configured to evaluate IDs of an incident associated with an incident log and group incident logs based on matches of one or more IDs. In an example, rate manager 108 correlates incident logs based on respective Customer IDs. In some embodiments, a de-duplication process is used to remove duplicate incident logs from the data storage. For example, rate manager 108 may determine two or more incident logs are duplicate reports if a count of matching IDs exceeds a threshold. In some embodiments, rate manager 108 may filter incident logs based on IDs and/or in response to a received request.

In embodiments, rate manager 108 is further configured to determine interruption rates due to outages based on incident logs. For example, rate manager 108 may be configured to determine an interruption rate as a quotient of a total interruption count divided by a total active resource time. The total interruption count indicates how many resources were impacted by outages for an evaluated group of resources for an evaluation period. The total active resource time may be determined from a measurement of available resources within the evaluated group of resources for an evaluation period. For example, the total active resource time may be determined from the average number of available resources normalized by the amount of time in the evaluation period. In other words, the total active resource time may be determined by multiplying the average count of active resources for a unit of time (e.g., one day) by the amount of time in the evaluation period (e.g., 365 days). The evaluated group of resources may be a segment of resources selected based on one or more temporal factors (e.g., day, month, week, quarter, year, and/or the like), spatial factors (e.g., geographic zone, region, and/or datacenter), logical factors (e.g., detection source, workflow, root cause, causing service, impact plane, and/or customer), and/or the like, or the evaluated group may include all available resources (e.g., the entirety of a service provider's infrastructure). The resulting interruption rates are comparable across various segments in order to identify hot spots, trends, contributing factors, and/or other related information, as described elsewhere herein or otherwise known. The evaluation period may be any suitable timespan such as one or more hours, days, weeks, months, quarters, years, and/or the like.

Rate manager 108 may be configured to determine a scaled interruption rate, such as by multiplying the interruption rate by a scaling factor. In embodiments, the scaling factor represents a conversion factor (i.e., a ratio of a scaled period in the units of the evaluation period to the scaled period in the units desired). In an example, the evaluation period is a 24-hour period (i.e., one day), and the scaled period is a year, which would provide a scaling factor of 365. In this context, rate manager 108 may be configured to determine an annual interruption rate due to outages ("AIR-O" herein). In embodiments, the scaling factor may be changed dynamically according to changes in lengths of evaluation periods and/or scaled periods. Rate manager 108 may be further configured to determine a time-average of the scaled interruption rate over several evaluation periods. In this context, the time-average of the scaled interruption rate can be considered the representative or effective rate during the scaled period.

Rate manager 108 may be configured to determine interruption rates in various ways. For instance, in an embodiment, rate manager 108 is configured to determine an interruption rate according to Equation 1 as follows:

$$IR\text{-}O = \frac{I_{Resources}}{R_{Active} * t_{Evaluation}} * SF \qquad \text{(Equation 1)}$$

In Equation 1, IR-O is the interruption rate, $I_{Resources}$ is an interruption count representative of a number of interruptions on resources caused by outages during the evaluation period, $R_{Active}$ is a count of active resources (e.g., an average count of active resources) during the evaluation period, $t_{Evaluation}$ is the length of the evaluation period, and SF is the scaling factor. In this way, the interruption rate is determined as a quotient of the interruption count, $I_{Resources}$, divided by the total active resource time, the product of $R_{Active}$ and $t_{Evaluation}$. In an example, IR-O is representative of an expected annual interruption rate due to outages (i.e., AIR-O), where $t_{Evaluation}$ is 1 day and SF is 365 days/year.

In an embodiment, rate manager 108 is alternatively or additionally configured to determine an interruption duration rate by summing interruption durations to generate a total interruption duration and dividing the total interruption duration by the total active resource time. In embodiments, rate manager 108 may scale and/or average interruption duration rates similar to the scaling and averaging methods described with respect to interruption rates above. For instance, in one example, the evaluation period is a 24-hour period (i.e., one day), and the scaled period is a year, which would provide a scaling factor of 365. In this context, rate manager 108 may be configured to determine an annual interruption duration rate due to outages ("AIR-OD" herein).

Rate manager 108 may be configured to determine interruption duration rates in various ways. For instance, in an embodiment, rate manager 108 determines an interruption duration rate according to Equation 2 as follows:

$$IR\text{-}OD = \frac{t_{Duration}}{R_{Active} * t_{Evaluation}} * SF \qquad \text{(Equation 2)}$$

In Equation 2, IR-OD is the interruption duration rate, $t_{Duration}$ is a total interruption duration representative of the length of interruptions on resources caused by outages during the evaluation period, and the remaining variables are the same as in Equation 1. In this way, the interruption duration rate may be determined as a quotient of the total interruption duration, $t_{Duration}$, divided by the total active resource time, the product of $R_{Active}$ and $t_{Evaluation}$. In an example, IR-OD is representative of an expected annual interruption duration rate due to outages (i.e., AIR-OD), where $t_{Evaluation}$ is 1 day and SF is 365 days/year. In some embodiments, $t_{Duration}$ is determined by rate manager 108 as a sum of interruption durations associated with the evaluated incident logs.

Rate manager 108 may be further configured to store the determined interruption rates and/or interruption duration rates in a data storage. In embodiments, each IR-O and/or IR-OD number is attributed to its supporting service and/or root causes via correlating the impacted resources to the associated outages.

Insight manager 110 is configured to evaluate interruption rates and/or interruption duration rates and generate an actionable insight report. For example, insight manager 110 may be configured to evaluate interruption rates and/or interruption duration rates to determine actionable insights based on the evaluation. An actionable insight is information indicative of degradations and/or failures in the cloud computing service. In this context, insight manager 110 may be further configured to generate an actionable insight report including the determined actionable insights. In some embodiments, insight manager 110 may interface with a GUI to display the actionable insight report. Actionable insights may be used for corrective action deployment and/or enforcement in cloud computing service provider systems. The corrective actions may be manually implemented by a user (e.g., a system administrator) and/or automatically (e.g., by a computing device).

For instance, insight manager 110 may be configured to evaluate interruption rates and/or interruption duration rates to determine actionable insights with respect to a set of resources. The set of resources may be a segment of resources based on one or more factors mentioned elsewhere herein (or otherwise known), including temporal factors, spatial factors, logical factors, and/or the like, or the group may include the entirety of a service provider's infrastructure.

Thus, embodiments of system 100 provide for intelligent outage evaluation and insight management for MIMSs. For example, a service team (e.g., a technical support team, hardware repair team, customer care team, a project management team, or an engineering team) of a service provider may interface with MIMS 104 to receive interruption rates and/or interruption duration rates for sets of resources as well as the associated actionable insights. In some embodiments, the MIMS includes a graphic user interface (GUI) for displaying hierarchical data, interruption rates, interruption duration rates, actionable insights, and/or the like (e.g., impact data of respective incidents, correlation data between incidents, communication information associated with incidents, or responsible service teams of respective incidents). The data displayed in the GUI may be represented by graphical indications associated with one or more actionable insights. In an example, a service team member may interface with the GUI pertaining to a segment of resources provided by the corresponding service provider. In this context, the GUI displays an interruption rate, interruption duration rate, actionable insights, and/or identifying information related to a relevant segment of resources.

Figure 2:
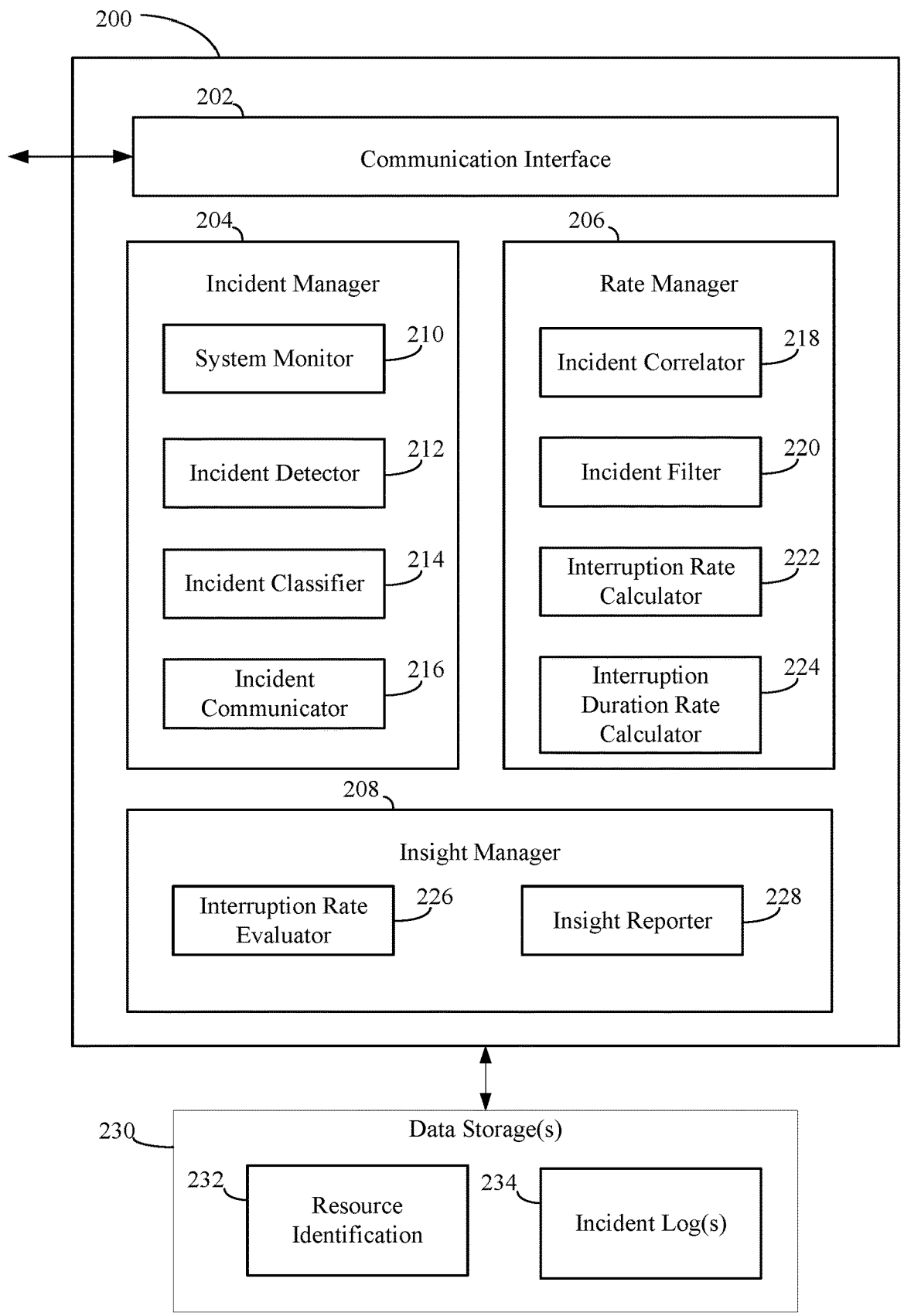
FIG. 2 is a block diagram of a monitoring system for intelligent outage evaluation and insight management, according to an example embodiment.

Note that MIMS 104 of FIG. 1 may be implemented in various ways to perform its functions. For instance, FIG. 2 is a block diagram of a MIMS 200 configured for intelligent outage evaluation and insight management ("system 200" herein), according to an example embodiment. System 200 is an example embodiment of MIMS 104 of system 100 in FIG. 1. System 200 is described as follows.

System 200 may be implemented in one or more computing devices, and, as shown in FIG. 2, includes a communication interface 202, an incident manager 204, a rate manager 206, and an insight manager 208. System 200 may be configured to interface with one or more data storage(s) 230, in embodiments. Data storage(s) 230 may include resource identification 232, one or more incident log(s) 234, and/or any other database/resource/incident information described herein. As shown in FIG. 2, data storage(s) 230 may be external to system 200, in embodiments, however, it is also contemplated herein that all of or a portion of data storage(s) 230 may be internal to system 200. The components of system 200 shown in FIG. 2 are described in further detail as follows.

Communication interface 202 may include any type or number of wired and/or wireless communication or network adapters, modems, etc., configured to enable system 200 to communicate intra-system with components thereof, as well as other devices and/or systems over a network, such as communications between system 200 and other devices, systems, and/or hosts, as described for system 100 in FIG. 1, over a network such as network 112.

Incident manager 204 is an embodiment of incident manager 106 of FIG. 1. As shown in FIG. 2, incident manager 204 may include a system monitor 210, an incident detector 212, an incident classifier 214, and/or an incident communicator 216 (e.g., embodied as submodules of incident manager 204). System monitor 210 is configured to monitor resources, such as server(s) 124-130 and/or computing device(s) 102 of FIG. 1 as described herein. Information received from the resources during the monitoring may include telemetry data (e.g., resource performance, resource failures, resource degradation, temperature, pressure, validation, and/or resource coverage), requests (e.g., for historical data, for outage updates, and/or for resource usage), notifications (e.g., user generated reports and/or server-side detections), and/or the like. In some embodiments, system monitor 210 may store the information in data storage(s) 230 for later processing. In some embodiments, system monitor 210 may be configured to monitor for completeness of the received information. In this case, if system monitor 210 determines expected data is missing, system 200 may send a notification to the service provider requesting the missing data.

Incident detector 212 is configured to detect anomalous activity and determine if the anomalous activity indicates an incident. For example, incident detector 212 may identify anomalous data from the information gathered by system monitor 210. In this case, incident detector 212 may log the anomalous data as an incident and store related information as an incident log of incident log(s) 234 with a corresponding incident ID. In some embodiments, incident detector 212 is further configured to detect incidents reported by users, e.g., from computing device(s) 102 via network 112 as described with respect to FIG. 1.

Incident classifier 214 is configured to associate incidents with an outage and further classify the incident. For example, incident classifier 214 may associate an incident detected by incident detector 212 to an outage and further classify the incident according to one or more IDs associated with the incident. The classification of the incident may be performed manually (e.g., via a service technician) or automatically (e.g., via incident classifier 214). In some embodiments, incident classifier 214 is configured to perform additional triage and diagnosis activities (e.g., determine a severity of the incident, send communication to a service team and/or customer, determine interruption counts, determine resources impacted by the incident, correlate an incident to other incidents, and/or the like). In some embodiments, incident classifier 214 retrieves data associated with one or more outages from data storage(s) 230 to associate the incident with an outage. In this context, logs may be received from within system 200.

Incident communicator 216 is configured to update incident logs associated with classified incidents. For example, incident communicator 216 may update an incident log of incident log(s) 234 associated with information from incident classifier 214. In some embodiments, incident communicator 216 is further configured to generate a communication report to be communicated to customers impacted by the incident. In one example, the communication report may be sent to customer devices, e.g., computing device(s) 102 of FIG. 1, via network 112. In another example, a service system associated with system 200 may manage and/or send the communication reports. In some embodiments, information related to communication reports and/or incident logs generated by incident communicator 216 is displayed in one or more GUIs. In this case, a service team may manage communications.

Rate manager 206 is an embodiment of rate manager 108 shown in FIG. 1. As shown in FIG. 2, rate manager 206 may include an incident correlator 218, an incident filter 220, an interruption rate calculator 222, and/or an interruption duration rate calculator 224. Incident correlator 218 is configured to correlate incident logs. For example, incident correlator 218 may correlate two or more of incident log(s) 234. Incident correlator 218 may evaluate IDs of an incident associated with an incident log and group incident logs based on matches of one or more matching IDs. In an example, incident correlator 218 matches incident logs based on respective Customer IDs.

In some embodiments of incident correlator 218, a de-duplication process is used to remove duplicate incident logs from among incident log(s) 234. For example, incident correlator 218 may determine two or more incident logs are duplicate logs if a count of matching IDs exceeds a threshold. As an example, a first incident log may indicate an incident impacting a set of resources associated with a customer's subscription on July $8^{th}$ and a second incident log may indicate an incident associated with the subscription and the set of resources reported by the customer on July $8^{th}$. In this example, incident correlator 218 may determine that the two incidents are the same and combine the information as a single incident log.

Incident filter 220 is configured to filter incident logs based on one or more temporal factors, spatial factors, logical factors, IDs, and/or report requests (e.g., a customer inquiry, a service provider inquiry, and/or support team evaluation). For example, incident filter 220 may filter a set of incident log(s) 234 prior to or as part of further processing. In some embodiments, incident filter 220 generates filter criteria (e.g., IDs, dates, offerings, customers, and/or fleets) to be used for further processing by rate manager 206. In some embodiments, system 200 receives a report request indicating which filter criteria is to be used. In an example, a service technician team may submit a report request regarding incidents associated with a segment of resources associated with one or more customers operating in a particular region subscribed to a particular offering. In another example, incident filter 220 receives filter criteria from a service technician team via a GUI.

Interruption rate calculator 222 is configured to determine interruption rates due to outages based on incident logs. For example, interruption rate calculator 222 may be configured to determine an interruption rate due to outages based on incident logs stored as incident log(s) 234, correlated by incident correlator 218, and/or filtered by incident filter 220. The interruption rate may be determined with respect to an evaluated group of resources, which may be selected based on a segment of resources (e.g., resources segmented by one or more temporal factors, spatial factors, logical factors, and/or the like) or may be selected as the entirety of a service provider's infrastructure. For example, the evaluated group of resources may be determined by incident filter 220. The interruption rate may be determined with respect to an evaluation period. In embodiments, the evaluated group of resources represents an average count of available resources for one or more evaluated offerings, fleets, regions, customers, subscriptions, resources, and/or the like. In some embodiments, the average count of available resources is stored in a data storage such as resource identification 232 or as part of respective incident log(s) 234. Interruption rate calculator 222 may be further configured to determine a total active resource time as the product of the evaluated group of resources and the evaluation period. Interruption rate calculator 222 may be further configured to store the determined interruption rate in data storage(s) 230.

Interruption rate calculator 222 may be configured to determine a scaled interruption rate, such as by multiplying the interruption rate by a scaling factor. In embodiments, the scaling factor represents a ratio of the evaluation period to a scaled period. In an example, the evaluation period is a 24-hour period, and the scaled period is a year. In this context, interruption rate calculator 222 may be configured to determine an AIR-O. Interruption rate calculator 222 may be further configured to determine an average scaled interruption rate by averaging scaled interruption rates over several evaluation periods.

Interruption rate calculator 222 may be configured to determine interruption rates in various ways. For instance, in an embodiment, interruption calculator 222 is configured to determine an interruption rate using Equation 1 as described above with respect to rate manager 108 of FIG. 1.

Interruption duration rate calculator 224 is configured to determine an interruption duration rate due to outages based on incident logs. For example, interruption duration rate calculator 224 may be configured to determine an interruption duration rate due to outages based on incident logs stored as incident log(s) 234, correlated by incident correlator 218, and/or filtered by incident filter 220. The interruption duration rate may be determined with respect to an evaluated group of resources, which may be selected based on a segment of resources (e.g., segmented by one or more temporal factors, spatial factors, logical factors, and/or the like) or may be selected as the entirety of a service provider's infrastructure. For example, the evaluated group of resources may be determined by incident filter 220. The interruption duration rate may be determined with respect to an evaluation period. In embodiments, the evaluated group of resources represents an average count of available resources for one or more evaluated offerings, fleets, regions, customers, subscriptions, resources, and/or the like. In some embodiments, the average count of available resources is stored in a data storage such as resource identification 232. Interruption duration rate calculator 224 may be further configured to determine a total active resource time as the product of the evaluated group of resources and the evaluation period. Interruption duration rate calculator 224 may be further configured to store the determined interruption duration rate in data storage(s) 230.

Interruption duration rate calculator 224 may also be configured to determine a scaled interruption duration rate and by multiplying the interruption duration rate by a scaling factor. In embodiments, the scaling factor represents a ratio of the evaluation period to a scaled period. In an example, the evaluation period is a 24-hour period, and the scaled period is a year. In this context, interruption duration rate calculator 224 may be configured to determine an annual interruption duration rate due to outages. Interruption duration rate calculator 224 may be further configured to determine an average scaled interruption duration rate by averaging scaled interruption duration rates over several evaluation periods.

Interruption duration rate calculator 224 may be configured to determine interruption duration rates in various ways. For instance, in an embodiment, interruption duration rate calculator 224 is configured to determine an interruption duration rate according to Equation 2 as described above with respect to rate manager 108 of FIG. 1.

Embodiments of interruption rate calculator 222 and interruption duration rate calculator 224 may determine respective rates in any segment of resources. For example, a segment may be composed of resources associated with various IDs. In an example, a set of resources are evaluated for a customer ("Customer 1") in a region ("Region 1") on a date ("Day D"), which considers all resources owned by Customer 1 in Region 1 on Day D. In another example, a set of resources are evaluated for all customers in all regions for a fleet on a date (e.g., "Day D").

While embodiments of interruption rate calculator 222 and interruption duration rate calculator 224 have been described with evaluation periods of 1 day and scaled periods of a year, other implementations may use different resolutions of evaluation periods and/or be scaled to different scaled periods. For example, resolutions of evaluation periods may be one or more hours, days, weeks, months, quarters, years, and/or the like. This can then be scaled to any length of scaled period, such as one or more days, weeks, months, quarters, years, decades, and/or the like. As described above, some embodiments may determine a time-average of scaled interruption rates and/or scaled interruption duration rates. Further, some embodiments may determine a rolling time-average of scaled interruption rates and/or scaled interruption duration rates for a scaled period. In an example, rolling annual averages of AIR-O and AIR-OD values are determined.

Insight manager 208 is an embodiment of insight manager 110 shown in FIG. 1. As shown in FIG. 2, insight manager 208 may include an interruption rate evaluator 226 and/or an insight reporter 228. Interruption rate evaluator 226 is configured to evaluate interruption rates and/or interruption duration rates to determine impacts to sets of resources. For example, interruption rate evaluator 226 may evaluate outputs of interruption rate calculator 222 and/or interruption duration rate calculator 224 to determine impacts to resources of sets of servers 124-130 in FIG. 1 for a scaled period. In embodiments, interruption rate evaluator 226 determines types of outages, types of incidents (e.g., subsets of outages), impact of incidents (e.g., resources affected by an incident), interruption trends, responsible services, root causes, and/or the like. The set of resources evaluated by interruption rate evaluator 226 may be a segment of resources (e.g., segmented by one or more temporal factors, spatial factors, logical factors, and/or the like) or may be the entirety of a service provider's infrastructure. For example, the set of resources may be determined based on filter criteria identified by incident filter 220.

Insight reporter 228 is configured to generate one or more actionable insights based on evaluated interruption rates and/or interruption duration rates, as further described elsewhere herein. For example, insight reporter 228 generates an actionable insight report based on the output of interruption rate evaluator 226. An actionable insight is information indicative of degradations and/or failures in the cloud computing service. In some embodiments, insight reporter 228 may interface with a GUI to report the actionable insights. Actionable insights may be used for corrective action deployment and/or enforcement in cloud computing service provider systems. The corrective actions may be manually implemented by a user (e.g., a system administrator) and/or automatically (e.g., by a computing device).

In some embodiments, system 200 includes, or interfaces with, a GUI for a user to interface with incident manager 204, rate manager 206, insight manager 208, and/or their respective submodules. For example, a service team member may provide inputs to the GUI to request one or more of AIR-O calculations, AIR-OD calculations, and/or actionable insights associated with a segment of resources. In an example, a service team provides a customer and an offering as inputs to the GUI and receives hierarchical data, associated incidents, AIR-O and AIR-OD values, actionable insights, trendlines, hot spots, contributing factors, and causal factors related to those inputs.

System 200 may operate in various ways, in embodiments. For instance, FIG. 3A shows a flowchart 300 for intelligent outage evaluation and insight management, according to an example embodiment. In an embodiment, system 200 performs flowchart 300. Flowchart 300 is described as follows with respect to system 100 of FIG. 1 and system 200 of FIG. 2. Further structural and operational embodiments will be apparent to persons skilled in the relevant art(s) based on the following description. Note that not all steps of flowchart 300 need be performed in all embodiments.

Flowchart 300 starts at step 302. In step 302, a set of incident logs associated with a cloud computing service is received. For example, rate manager 206 as described for FIG. 2 may be configured to receive (e.g., by retrieval) incident log(s) 234 stored in data storage(s) 230. In embodiments, each incident log includes impact data corresponding to a respective incident that occurred during an evaluation period. The impact data may include information pertaining to the incident, such as, an interruption count representative of a number of interruptions on resources caused by the respective incident, a list of resources impacted by the incident (e.g., individual or groups of resources such as server(s) 124-130 of FIG. 1, subscriptions, offerings, regions, customers, and/or the like), the duration of the incident, the time to mitigate the incident, the outage associated with the incident, checkpoints of the lifecycle of the incident, and/or the like. In embodiments, rate manager 206 retrieves the set of incident logs from a data system (e.g., data storage(s) 230) or receive the set of incident logs from an internal (e.g., incident manager 204) or external (e.g., via network 112) component of system 200. In some embodiments, system 200 receives a request for an interruption rate from either another component of system 200 (e.g., a user interface) or communication received external to system 200 (e.g., a request over network 112 of FIG. 1). In this context, rate manager 206 may retrieve the incident logs stored as incident log(s) 234 associated with information indicated in the request (e.g., IDs, telemetry data, and/or impact data). In another embodiment, system 200 receives a request for an interruption rate and prepares the set of incident logs. In this context, system 200 sends the set of incident logs to rate manager 206 for further processing.

In step 304, a total active resource time is determined. In embodiments, the total active resource time is representative of resource activity during the evaluation period. For example, interruption rate calculator 222 and/or interruption duration rate calculator 224 as described in FIG. 2 determine the total active resource time based on data stored in data storage(s) 230, monitored by system monitor 210, stored external to system 200, inputted via a GUI, received via communication interface 202, and/or the like. In an example embodiment, resource activity is monitored by system monitor 210 and stored in data storage(s) 230.

In step 306, an interruption rate for the evaluation period is determined as a quotient of a total interruption count divided by the total active resource time. For example, interruption rate calculator 222 as described in FIG. 2 determines the interruption rate by generating a total interruption count by summing interruption counts of the incident logs received in step 302, and dividing the total interruption count by the total active resource time. In embodiments, the interruption rate is determined using Equation 1 as described with respect to FIG. 1 above.

In step 308, an interruption duration rate for the evaluation period is determined by generating a total interruption duration by summing interruption durations of the set of incident logs and dividing the total interruption duration by the total active resource time. For example, Interruption duration rate calculator 224 as described in FIG. 2 determines the interruption duration rate by generating a total interruption duration by summing interruption durations of the incident logs received in step 302 and dividing the total interruption duration by the total active resource time. In embodiments, the interruption rate may be determined using Equation 2 as described with respect to FIG. 1 above.

Note that one or both of steps 306 and 308 may be performed during an iteration of flowchart 300.

In step 310 of flowchart 300, one or more actionable insights applicable to the cloud computing service are generated based at least on the interruption rate and/or the incident logs. For example, interruption rate evaluator 226 of insight manager 208, as further described above with respect to FIG. 2, may generate one or more actionable insights based on the interruption rate determined by interruption rate calculator 222, the interruption duration rate determined by interruption duration rate calculator 224, and/or the incident logs received in step 302. The generation of one or more actionable insights may be further based on information regarding the types of incidents/outages, impact of incidents (i.e., resources affected by an incident), interruption trends, responsible services, root causes, and/or the like, as further described elsewhere herein. In embodiments, an actionable insight is information indicative of degradation of and/or failures in the cloud computing service, as described elsewhere herein. Actionable insights may be used for corrective action deployment and/or enforcement in cloud computing service provider systems, in embodiments.

In step 318, a graphical indication associated with the one or more actionable insights is displayed in a user interface. For example, insight reporter 228 as described in FIG. 2 may interface with a GUI to display the actionable insights. In embodiments, responsible services and/or users interact with the GUI to review, address, and/or enforce the one or more actionable insights. In some embodiments, actionable insights are communicated to responsible services and/or users via a variety of notification mediums (e.g., e-mail messages, text messages, mobile device notifications, application notifications, and/or computer device notifications), either in addition to or in place of a GUI.

Note that step 310 may be performed in various ways. For instance, FIG. 3B shows a flowchart 320 providing a process for generating actionable insights, according to an example embodiment. In an embodiment, flowchart 320 is an example process for step 310 of FIG. 3A, and interruption rate evaluator 226 may be configured to perform flowchart 320. Flowchart 320 is described as follows with respect to system 100 of FIG. 1 and system 200 of FIG. 2. Further structural and operational embodiments will be apparent to persons skilled in the relevant art(s) based on the following description.

Flowchart 320 starts at step 312. In step 312, the interruption rate, the interruption duration rate, and/or the set of incident logs received in step 302 are analyzed to attribute the interruption rate and/or the interruption duration rate to at least one root cause and/or responsible service. For example, interruption rate evaluator 226 as described in FIG. 2 may analyze the interruption rate determined by interruption rate calculator 222, the interruption duration rate determined by interruption duration rate calculator 224, and/or the received set of incident logs. In this context, interruption rate evaluator 226 may attribute the interruption rate and/or interruption duration rate to at least one root cause and/or responsible service. Root causes may include service errors (e.g., code defects, code bugs, service threshold errors, and configuration errors), infrastructure errors (e.g., IT hardware errors, IT communication errors, and power outages), network errors (e.g., network software errors, network hardware errors, network outages, and network maintenance), unknown errors, and/or the like. Responsible services may include a service provider, a service team, a member of a service team, and/or the like.

In step 314, management of the interruption rate and/or the interruption duration rate is assigned to the at least one responsible service. For example, insight reporter 228 as described in FIG. 2 assigns management of the interruption rate determined by interruption rate calculator 222 and/or the interruption duration rate determined by interruption duration rate calculator 224 to a responsible service. In this context, responsible services may be assigned management based on one or more assignment criteria, such as IDs of incident logs associated with the interruption rate and/or the interruption duration rate, root cause, factors for selecting segments of resources (e.g., temporal factors, spatial factors, or logical factors), availability of service technicians (e.g., team size, working hours, or task backlog), urgency of mitigating associated outages (e.g., risks to businesses, risks to customers, risks to third parties, customer type, or service type), and/or the like. In some embodiments, tasks associated with the management of the interruption rate and/or the interruption duration rate may be divided among multiple responsible services. In an example, a customer service team is assigned management of communications with impacted customers, a service technician team is assigned management of resolving service errors, and a business management team is assigned management of network investment and improvement opportunities.

In step 316, one or more actionable insights are determined based on the analysis in step 312 and/or the assignment in step 314. For example, insight reporter 228 as described in FIG. 2 may determine the one or more actionable insights based on the analysis done by interruption rate evaluator 226 in step 312 and the assignment done in step 314. In embodiments, the one or more actionable insights are addressed or enforced automatically (e.g., via a MIMS), manually (e.g., via a service technician, service team, or service provider), or through a combination of automatic and manual operations.

Figure 4:
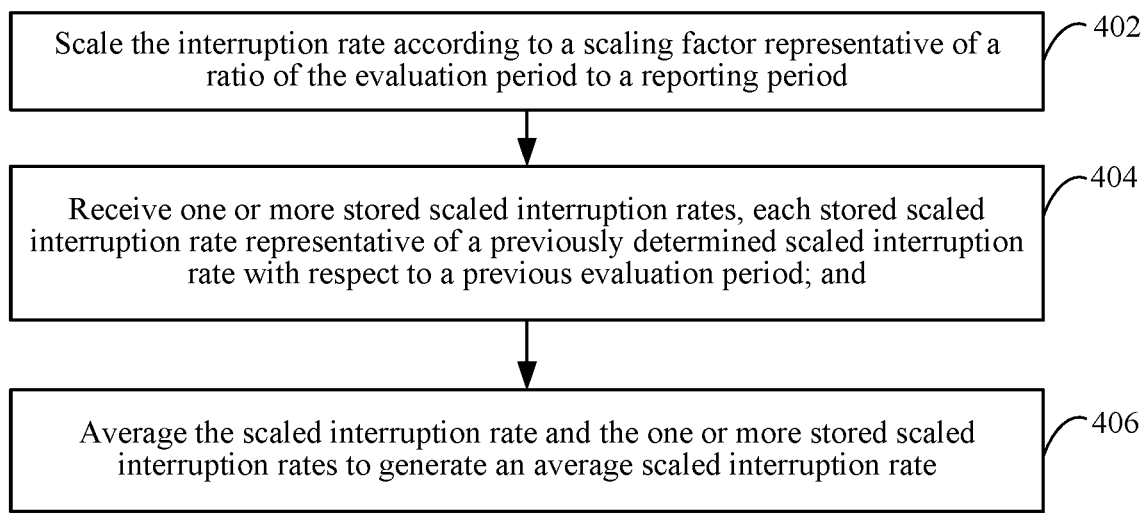
FIG. 4 is a flowchart providing a process for scaling and averaging interruption rates, according to an example embodiment.

As described above, determined interruption rates may be scaled and/or averaged, which may be performed in various ways. For instance, FIG. 4 shows a flowchart 400 for scaling and averaging interruption rates is shown, according to an example embodiment. Flowchart 400 is described as follows with respect to FIGS. 1-3. Note that not all steps of flowchart 400 need be performed in all embodiments.

Flowchart 400 starts at step 402, which may be performed subsequent to any of steps 306-318 of flowchart 300 in FIGS. 3A and 3B. In step 402, the interruption rate is scaled according to a scaling factor. For example, interruption rate calculator 222, as further described above with respect to FIG. 2, scales the interruption rate by the scaling factor. In embodiments, the scaling factor is a conversion factor (i.e., a ratio of the evaluation period to a scaled period).

In step 404, one or more stored scaled interruption rates are received. For example, interruption rate evaluator 226 as described in FIG. 2 may receive one or more stored scaled interruption rates as part of its evaluation operation. In another example, interruption rate calculator 222 may receive one or more stored scaled interruption rates as part of further calculations described below with respect to step 406. In embodiments, each stored scaled interruption rate is representative of a previously determined scaled interruption rate with respect to a previous evaluation period. In embodiments, the one or more stored scaled interruption rates correspond to a review period (e.g., one or more days, weeks, months, quarters, years, and/or the like). In an example, a review period is the prior year.

In step 406, the scaled interruption rate and the one or more stored scaled interruption rates are averaged to generate an average scaled interruption rate. For example, interruption rate calculator 222 may generate the average scaled interruption rate by averaging the scaled interruption rate generated in step 402 with the one or more stored scaled interruption rates received in step 404. In this context, the average scaled interruption rate may be evaluated by interruption rate evaluator 226 as part of the process to generate one or more actionable insights (e.g., as described with respect to step 310 of flowchart 300 in FIGS. 3A and 3B). In some embodiments, a rolling average scaled interruption rate is determined by averaging the scaled interruption rate with one or more stored scaled interruption rates corresponding to a review period, where the review period is updated periodically. In an example, a rolling average scaled interruption rate is determined by averaging the scaled interruption rate with stored scaled interruption rates corresponding to the last year.

Figure 5:
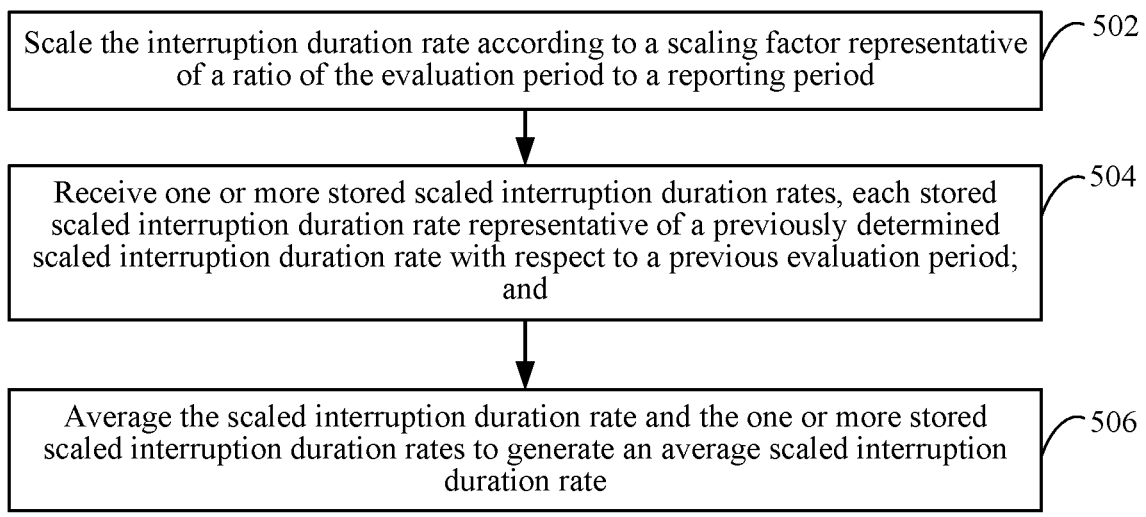
FIG. 5 is a flowchart providing a process for scaling and averaging interruption duration rates, according to an example embodiment.

In embodiments, determined interruption duration rates are also scaled and/or averaged. For instance, FIG. 5 shows a flowchart 500 for scaling and averaging interruption duration rates, according to an example embodiment. Flowchart 500 is described as follows with respect to FIGS. 1-3. Note that not all steps of flowchart 500 need be performed in all embodiments.

Flowchart 500 starts at step 502, which may be performed subsequent to any of steps 308-318 of flowchart 300 in FIGS. 3A and 3B. In step 502, the interruption duration rate is scaled according to a scaling factor. For example, interruption duration rate calculator 224, as further described above with respect to FIG. 2, scales the interruption duration rate by the scaling factor. In embodiments, the scaling factor is a conversion factor (i.e., a ratio of the evaluation period to a scaled period).

In step 504, one or more stored scaled interruption duration rates are received. For example, interruption rate evaluator 226 as described in FIG. 2 may receive one or more stored scaled interruption duration rates as part of its evaluation operation. In another example, interruption duration rate calculator 224 may receive one or more stored scaled interruption duration rates as part of further calculations described below with respect to step 506. In embodiments, each stored scaled interruption duration rate is representative of a previously determined scaled interruption duration rate with respect to a previous evaluation period. In embodiments, the one or more stored scaled interruption duration rates correspond to a review period. In an example, a review period is the last year.

In step 506, the scaled interruption duration rate and the one or more stored scaled interruption duration rates are averaged to generate an average scaled interruption duration rate. For example, interruption duration rate calculator 224 may generate the average scaled interruption duration rate by averaging the scaled interruption duration rate generated in step 502 with the one or more stored scaled interruption duration rates received in step 504. In this context, the average scaled interruption duration rate may be evaluated by interruption rate evaluator 226 as part of the process to generate one or more actionable insights (e.g., as described with respect to step 310 of flowchart 300 in FIGS. 3A and 3B). In some embodiments, a rolling average scaled interruption duration rate is determined by averaging the scaled interruption duration rate with one or more stored scaled interruption duration rates corresponding to a review period, where the review period is updated periodically. In an example, a rolling average scaled interruption duration rate is determined by averaging the scaled interruption duration rate with stored scaled interruption duration rates corresponding to the last year.

Figure 6:
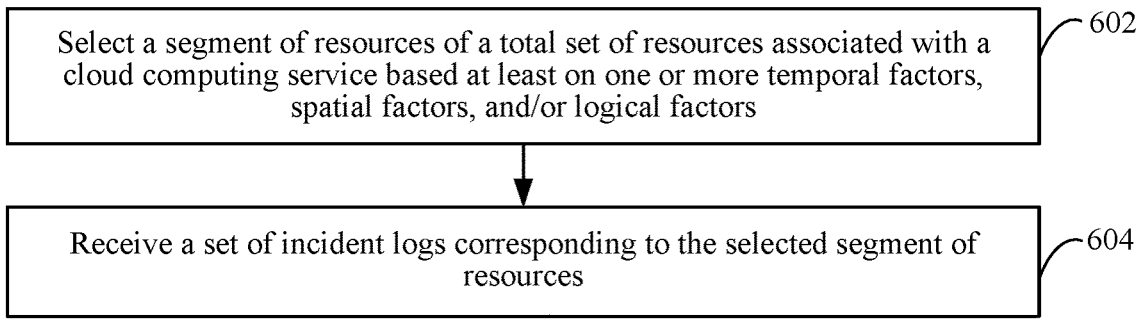
FIG. 6 is a flowchart providing a process for selecting a segment of resources for intelligent outage evaluation and insight management, according to an example embodiment.

In embodiments, resource segments are determined in various ways. For instance, FIG. 6 shows a flowchart 600 for selecting a segment of resources for intelligent outage evaluation and insight management, according to an example embodiment. Further structural and operational examples will be apparent to persons skilled in the relevant art(s) based on the following descriptions. Flowchart 600 is described as follows with respect to FIGS. 1-3.

Flowchart 600 begins with step 602. In step 602, a segment of resources is selected from a total set of resources associated with a cloud computing service based on one or more temporal factors, spatial factors, and/or logical factors. For example, system 200 in FIG. 2 may receive a request to determine and/or evaluate interruption rates for a segment of resources. In this context, the segment of resources may be selected based on one or more temporal factors, spatial factors, logical factors, and/or the like. In some embodiments, these factors are determined by operations of incident filter 220 as described elsewhere herein, received as user inputs in a GUI (e.g., by a service technician, a business management team member, or a project manager), received by communication interface 202 (e.g., over network 112 of FIG. 1), determined by another component of system 200, stored in a database (e.g., data storage(s) 230), and/or as otherwise would be understood by persons of skill in the relevant art(s) having benefit of this disclosure.

Step 604 may be performed in step 302 of flowchart 300. In step 604, a set of incident logs corresponding to the selected segment of resources are received (e.g., retrieved). For example, rate manager 206 as described for FIG. 2 receives a subset of incident log(s) 234 stored in data storage(s) 230 corresponding to the segment of resources selected in step 602. In this context, the set of incident logs corresponding to the selected segment of resources may be evaluated as described elsewhere herein (e.g., with respect to flowcharts 300, 400, or 500 above, with respect to flowcharts 700, 800, or 900 described below) or as otherwise would be understood by persons of skill in the relevant art(s) having benefit of this disclosure.

In embodiments, a segment of resources corresponds to one or more customers, regions, dates, fleets, offerings, resource clusters, and/or the like. In an example, a segment of resources corresponds to resources identified by customer, region, and date. In this context, the segment of resources is noted as the resources associated with one or more customers, in one or more regions, on one or more dates. For instance, a first segment of resources may be associated with a first customer in a first region on a particular date, a second segment of resources may be associated with a first customer in all regions on a particular date, and a third segment may be associated with all customers in all regions on a particular date. In this context, the first segment of resources may be referred to as a "customer region segment," the second segment of resources may be referred to as a "customer segment," and the third segment of resources may be referred to as a "fleet segment." By segmenting resources, a service provider may compare interruption rates and/or interruption duration rates between different segments to determine areas within the cloud computing service that need improvement or support.

Furthermore, in some embodiments, interruption rates and/or interruption duration rates are determined for a plurality of segments of the total set of resources. In this context, segments of resources and their respective rates may be compared as part of intelligent outage evaluation and insight management techniques described herein. For example, interruption rate calculator 222 of FIG. 2 may determine interruption rates for a plurality of segments of resources and interruption rate evaluator 226 may evaluate the determined interruption rates to generate one or more actionable insights. In this context, interruption rates corresponding to different segments of resources may be compared with one another. In embodiments, a service provider or system prioritizes one or more areas as "hot spots" for maintenance, investment, support, improvement, and/or the like. The plurality of segments of resources may be divided based on one or more temporal factors, spatial factors, logical factors, and/or the like, in embodiments. In an example, interruption rates and interruption duration rates for segments of resources corresponding to different geographic zones are determined and compared to determine a hot spot. In embodiments, segments of resources are different from each other or overlap with one another.

Moreover, methods, systems, and devices described above and elsewhere herein may be used to evaluate outages and manage insights for any segment, group of segments, sub-segment, or the like. For example, as described herein, embodiments have been discussed for calculating interruption rates and/or interruption duration rates for segments such as fleets, regions, customers, resource clusters, resources, subscriptions, offerings, service provider systems, and/or the like; however, it is also contemplated herein that interruption rates and/or interruption duration rates may be determined for groups of one or more such segments. For example, rates may be determined for Fortune 500 companies, customers with the computer core usage at or above a threshold, customers with the support request frequencies at or above a threshold, life and safety customers, premium subscription customers, most active regions, most popular subscriptions, and/or the like.

Figure 7:
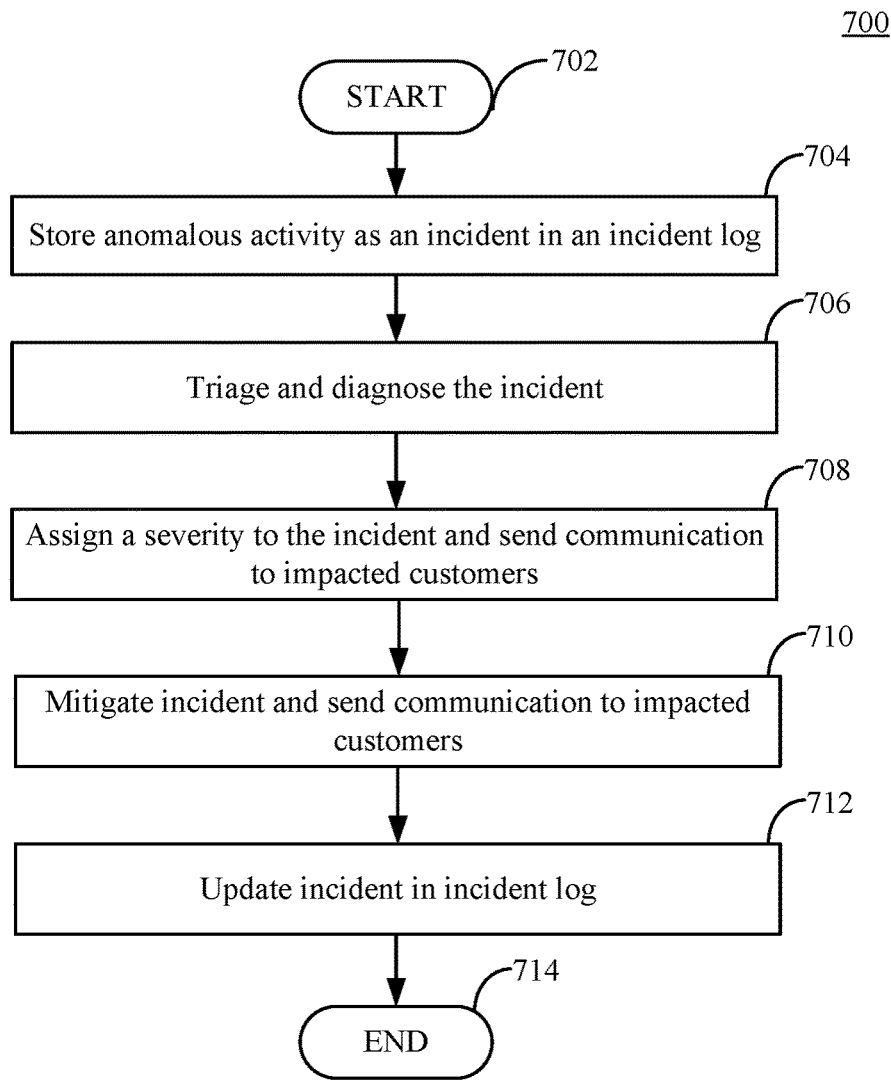
FIG. 7 is a flowchart providing a process for monitoring and managing incidents, according to an example embodiment.

In embodiments, anomalous activities may be detected and logged. For instance, FIG. 7 is a flowchart 700 for monitoring and managing incidents, according to an example embodiment. Further structural and operational examples will be apparent to persons skilled in the relevant art(s) based on the following descriptions. Flowchart 700 is described as follows with respect to system 100 of FIG. 1 and system 200 of FIG. 2.

Flowchart 700 begins with step 702. In step 702, an anomalous activity is detected or reported. For example, the anomalous activity may be detected by incident detector 212 of system 200 as described with respect to FIG. 2 or reported by a user (e.g., a customer) over network 112 of FIG. 1. As part of step 702, incident detector 212 determines if the anomalous activity indicates an incident. For instance, if the anomalous activity is outside a predetermined limit, incident detector determines the anomalous activity is indicative of an incident and flowchart 700 proceeds to step 704.

In step 704, the detected anomalous activity is stored as an incident in an incident log. For example, incident detector 212 of system 200 as described with respect to FIG. 2 may store the anomalous activity as one of incident log(s) 234 in data storage(s) 230. Each incident log may store information corresponding to a single anomalous activity or may store information for multiple anomalous activities.

In step 706, the incident is triaged and diagnosed. For example, incident classifier 214 may be configured to triage and diagnose the incident. In embodiments, the triage and diagnosis activity is manual (e.g., by a service technician), automatic (e.g., by incident classifier 214), or a combination of both. In embodiments, incident classifier 214 updates the associated incident log during, as part of, or after the triage and/or diagnosis activity. The triage and diagnosis activity may include various operations, for example, as part of the triage and diagnosis activity, some embodiments may classify the incident according to IDs associated with the incident. Other triage and diagnosis activities may include sending communication to a service team and/or customer, determining an interruption count for the incident, determining resources impacted by the incident, correlating incident to an outage or other incidents, and/or the like.

In step 708, a severity is assigned to the incident and a communication is sent to impacted customers. For example, incident classifier 214 as described in FIG. 2 may determine and assign a severity to the incident and incident communicator 216 may send a communication report to customers impacted by the incident. In embodiments, the severity is assigned automatically (e.g., by incident classifier 214) or manually (e.g., by a service technician). The severity may be determined based on factors such as an expected time to mitigate the incident, a count of interruptions caused the incident, the number of resources impacted, the type of incident/outage, and/or the like. In embodiments, the communication report is sent to customers based on IDs associated with the incident. The communication report may indicate to the customer impact information such as which resources or subscriptions are impacted, the severity of the incident, an expected time to mitigate the incident, the type of incident/outage, contact information for customer support, information associated with a managing service team, and/or the like. In some embodiments, incident communicator 216 is further configured to periodically update impacted customers on the status of the incident.

In step 710, the incident is mitigated, and a communication is sent to impacted customers. For example, once an incident detected by incident detector 212 and classified by incident classifier 214 has been mitigated, incident communicator 216 may send a communication report to customers impacted by the incident. In embodiments, the incident is mitigated manually (e.g., by a service technician or service team), automatically (e.g., by incident manager 204, another component of system 200, or another component of the cloud computing service provider system), or a combination of manual or automatic methods. In a first example, incident manager 204 receives an update from a service technician (e.g., by a GUI or over network 112) indicating the incident has been mitigated. In a second example, system monitor 210 monitors information received over network and indicates when the incident has been mitigated. In embodiments, once an incident has been mitigated, incident communicator 216 sends a communication report to impacted customers indicating the mitigation of the incident. The communication report may be sent to customers based on IDs associated with the incident. The communication report may indicate to the customer impact information such as which resources or subscriptions are impacted, the severity of the incident, the total time to mitigate the incident, the type of incident/outage, contact information for customer support, information associated with a managing service team, a history of incidents corresponding to the customer, and/or the like.

In step 712, the incident is updated in the incident log and the monitoring and managing process subsequently ends in step 714. For example, incident communicator 216 as described with respect to FIG. 2 may be configured to update the associated incident log stored in data storage(s) 230. In some embodiments, incident communicator 216 updates the associated incident log every time a communication report is sent to a customer and/or a service team.

Accordingly, processes for monitoring and managing incidents are described herein. As described above, detected and/or reported incidents may be logged as incident logs in a data system (e.g., data storage(s) 230, incident log(s) 234, or any other data storage medium). In this context, the lifecycle of an incident may be tracked and logged within a respective incident log. Further, checkpoints may be designated for each part of the incident's life cycle. For example, a checkpoint may designate the state of the incident at any of steps 702-714 of flowchart 700. In an embodiment, a checkpoint is created whenever a communication is sent to a customer and/or service team. In another embodiment, checkpoint(s) are created periodically until the incident is mitigated. In embodiments, checkpoint(s) are created at various stages, such as when a resource is in its normal running state, when an anomalous activity starts, when the anomalous activity is detected as an incident, during points of triaging and diagnosing of an incident, when communication of an outage is made, when the incident/outage is mitigated, and/or during post-outage review. A checkpoint may indicate impact data associated with the incident during the time the checkpoint was made. In embodiments, checkpoints and associated information are stored as impact data of a respective incident log.

Furthermore, in some embodiments, one or more steps of flowchart 700 are not performed. For instance, in an example, the incident log may not be stored until step 712. In another example, a severity is not assigned to the incident. In yet another example, communication is not sent to impacted customers until after the incident is mitigated.

Figure 8:
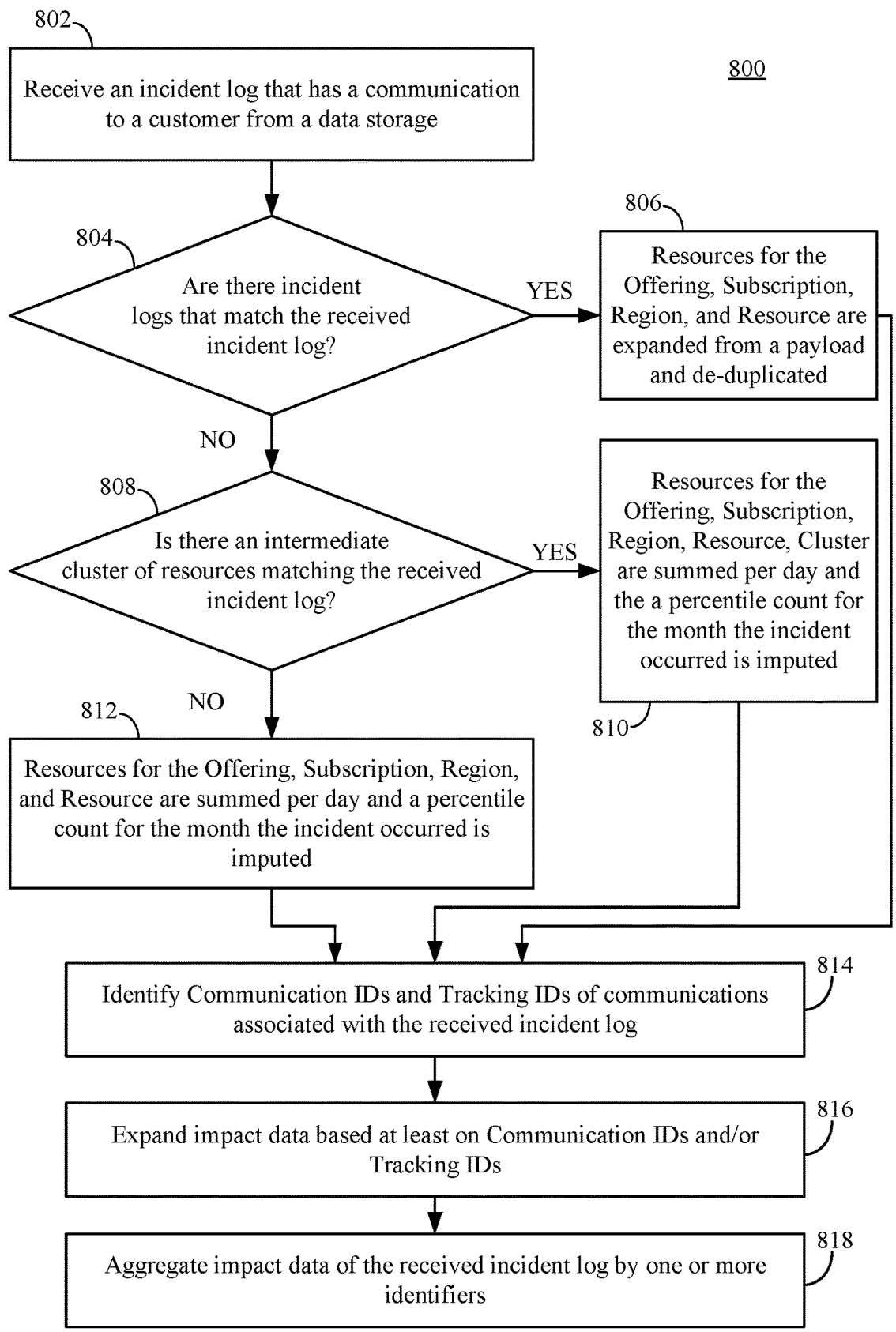
FIG. 8 is a flowchart providing a process for correlating incident logs and aggregating impact data, according to an example embodiment.

In embodiments, incident logs are correlated and aggregated in various ways. For instance, FIG. 8 is a flowchart 800 providing a process for correlating incident logs and aggregating impact data, according to an example embodiment. Further structural and operational examples will be apparent to persons skilled in the relevant art(s) based on the following descriptions. Flowchart 800 is described as follows with respect to system 100 of FIG. 1 and system 200 of FIG. 2. In embodiments, one or more steps of flowchart 800 are not performed.

Flowchart 800 begins with step 802. In step 802, an incident log that has a communication to a customer is received from a data storage. For example, rate manager 206 as described with respect to FIG. 2 may receive one or more of incident log(s) 234 from data storage(s) 230. In embodiments, the incident log includes various IDs associated with the incident, as described elsewhere herein or otherwise known. In some embodiments, the received incident log is selected based on one or more factors (e.g., filter criteria of incident filter 220, user inputs of a GUI, or factors described with respect to step 602 of flowchart 600). In embodiments, step 802 is performed for a single incident log or a set of incident logs. In some embodiments, step 802 is performed for incident logs without communications to a customer. While step 802 has been described with respect to incident logs received from a data storage, in some embodiments of the present disclosure, incident logs may be received in other ways. For example, an incident log may be received from a computing device over network 112 of FIG. 1, by communication interface 202 of FIG. 2, as inputs to a GUI, from another storage medium, and/or as otherwise would be understood by persons of skill in the relevant art(s) having benefit of this disclosure.

In step 804, a lookup check is performed to determine if there are incident logs stored in a data system that match the received incident log. For example, incident correlator 218 as described with respect to FIG. 2 may determine the received incident log matches another incident log stored in data storage(s) 230. This match may be determined by comparing respective IDs between the two incident logs and determining that one or more IDs are the same. For instance, incident correlator 218 may determine the received incident log matches one or more other incident logs if a count of matching IDs exceeds a threshold. In response to incident correlator 218 determining that the received incident log matches one or more other incident logs, flowchart 800 proceeds to step 806. In response to incident correlator 218 determining that the received incident log does not match another incident log, flowchart 800 proceeds to step 808.

In step 806, the resources associated with the incident are expanded upon and de-duplicated. For example, incident correlator 218 as described with respect to FIG. 2 may aggregate information related to the incident from the matching incident logs and de-duplicate the incident logs. In embodiments, incident correlator 218 stores an updated incident log in data storage(s) 230) and removes the duplicate incident logs. In some embodiments, a portion of the de-duplication process is done separately from the functions of incident correlator 218. For instance, a de-duplication process may be implemented by another component of system 200 to periodically (e.g., monthly, quarterly, semi-annually, annually, as part of a system update, or as part of routine maintenance) remove or merge incident logs stored as incident log(s) 234 that the component determines as duplicates. In some embodiments, this periodic de-duplication is implemented as a sub-function of incident correlator 218. In embodiments, an interruption count is determined from the de-duplicated incident log.

In step 808, a check is performed to determine if there is an intermediate cluster of resources that matches the received incident log. For example, incident correlator 218 as described with respect to FIG. 2 may determine if resources indicated in the received incident log are associated with an intermediate cluster of resources by evaluating the received incident log and information stored in resource identification 232. This check may be done in a variety of ways. For instance, incident correlator 218 may perform a lookup check on resource identification 232 to determine if resources associated with the received incident log are associated with an intermediate cluster. In embodiments, an intermediate cluster is a group of resources that share one or more IDs, share a Cluster ID (e.g., set by a managing service team or by another component of system 200), have a similar impact history (e.g., experience similar incident impact trends or have been impacted by the same incidents as each other in the past), and/or the like. In response to incident correlator 218 determining that the received incident log matches one or more intermediate clusters of resources, flowchart 800 proceeds to step 810. In response to incident correlator 218 determining that the received incident log does not match an intermediate cluster of resources, flowchart 800 proceeds to step 812.

In step 810, resources for an intermediate cluster matching the received incident are summed per day and a percentile count for the month the incident occurred in is selected as the interruption count for the incident. For example, incident correlator 218 as described with respect to FIG. 2 may retrieve resource information from resource identification 232 associated with the intermediate cluster determined in step 808. In an example, counts of resources associated with the intermediate cluster are summed per day in a month an incident occurred. In this context, the $50^{th}$ percentile count for the month is selected as the interruption count for the incident for that day. In other embodiments, different values of percentile counts are used.

In step 812, resources for an evaluated offering are summed per day and a percentile count for the month the incident occurred in is selected as the interruption count for the incident. For example, incident correlator 218 as described with respect to FIG. 2 may retrieve resource information from resource identification 232 associated with the evaluated offering. In embodiments, the evaluated offering includes one or more fleets, regions, customers, subscriptions, and/or resources managed by a cloud computing service provider. In some embodiments, multiple offerings are evaluated. For instance, a cloud computing service provider may evaluate their entire set of offerings. In an example, counts of resources associated with the evaluated offering are summed per day in a month an incident occurred. In this context, the $95^{th}$ percentile count for the month is selected as the interruption count for the incident for that day. In other embodiments, different values of percentile counts are used.

In step 814, communication and tracking IDs of communications associated with the received incident log are identified. For example, incident correlator 218 as described with respect to FIG. 2 may identify communications (e.g., user submitted reports sent over network 112, device generated reports sent over network 112, communications sent from system 200 over network 112, messages/alerts sent to or received from components within system 200, GUI inputs or outputs, or messages between service team members and/or customers) associated with the received incident log. Incident correlator 218 may be configured to assign communication and/or tracking IDs to the identified communications and to include these IDs in updated incident logs. In embodiments, the identified communications are filtered to only consider communications using particular types of publishing methods. For instance, communications may be filtered to only consider outage publishing methods (e.g., user reported outages, service team communications pertaining to outages, system generated outage reports, or device generated outage reports).

In step 816, impact data is expanded based at least on communication IDs and/or tracking IDs. For example, incident correlator 218 as described with respect to FIG. 2 may determine resources associated with the received incident based at least on communication IDs and/or tracking IDs identified in step 814. In embodiments, communication IDs and/or tracking IDs expand impact data to include additional offerings, subscriptions, regions, resource, fleets, customers, clusters, and/or the like. Some embodiments of flowchart 800 perform steps 814 and 816 for correlated incident logs identified in step 804, resources identified in step 810, and/or resources identified in step 812. Some embodiments of flowchart 800 perform one or more of steps 804-812 for portions of expanded impact data determined in step 816.

In step 818, impact data of the received incident log is aggregated according to one or more IDs. For example, incident correlator 218 or incident filter 220 as described with respect to FIG. 2 may aggregate impact data (e.g., data determined in steps 804-816) of the received incident log according to one or more IDs. In embodiments, the aggregated impact data is used to update the incident log for further processing and/or updating the stored information in an incident log.

The steps of flowchart 800 may be implemented in a variety of ways to determine an interruption count representative of a number of interruptions on resources caused by an evaluated set of incidents. For instance, in an example, in step 802 a set of incident logs corresponding to a virtual machine offering for a Subscription ID, "Subscription 1", of Customer ID, "Customer 1", are received by rate manager 206. In step 804, incident correlator 218 performs a lookup check to determine if information stored in data storage(s) 230 matches any of the set of incident logs corresponding to the virtual machine offering for Subscription 1 of Customer 1. In this context, incident correlator 218 determines that a first subset of incident logs, "Subset A", have respective matches stored in data storage(s) 230 and a second subset of incident logs, "Subset B", do not have matches. In step 806, incident correlator 218 aggregates each incident log of Subset A with their respective matches stored in data storage(s) 230 and de-duplicates the incident logs. In this context, after the de-duplication process, incident correlator 218 may store updated incident logs of Subset A in data storage(s) 230. In step 808, incident correlator 218 performs a check on resource identification 232 to determine if resources associated with incident logs of Subset B are associated with an intermediate cluster of resources. In this context, incident correlator 218 determines that a first further subset of incident logs, "Subset B-1", are associated with respective intermediate clusters of resources and a second further subset of incident logs, "Subset B-2", do not have matches. In step 810, incident correlator 218 aggregates each incident log of Subset B-1 with their respective 50th percentile count of resources associated with the respective intermediate cluster. In step 812, incident correlator 218 aggregates each incident log of Subset B-2 with their respective 95th percentile count of resources associated with the virtual machine offering for Subscription 1 of Customer 1. In step 814, communication and tracking IDs are identified by incident correlator 218 for communications associated with the received set of incident logs. In step 816, incident correlator 218 expands impact data for each incident of the received set of incident logs to include information detailed in respective communications. In step 818, incident correlator 218 respectively aggregates impact data determined in steps 804-816 for each incident log of the received set of incident logs. In this way, respective impact data for each incident log pertaining to the virtual machine offering for Subscription 1 of Customer 1.

Figure 9:
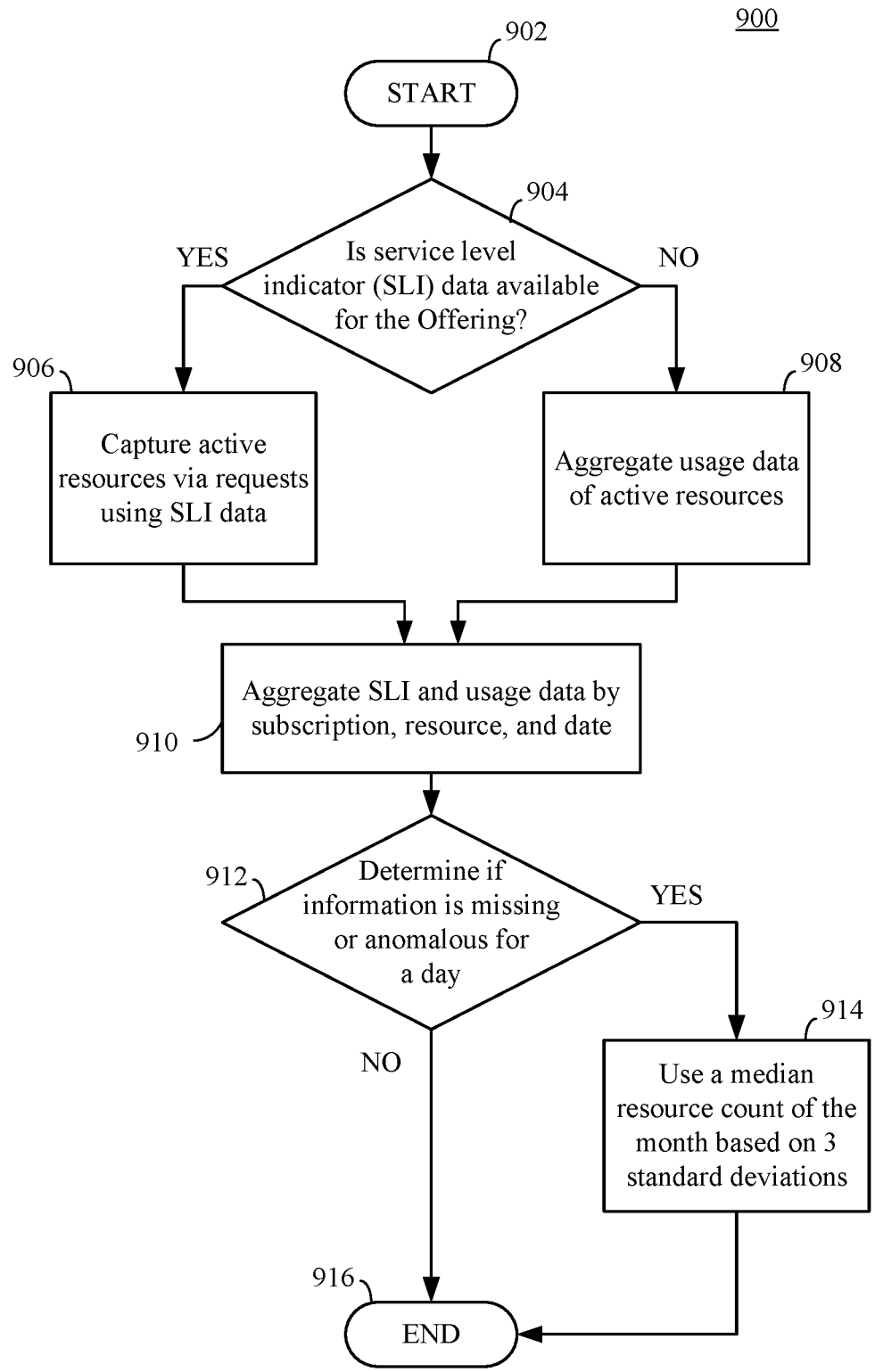
FIG. 9 is a flowchart providing a process for determining a total active resource time for an evaluation period, according to an example embodiment.

As described above, a total active resource time may be determined in various ways. FIG. 9 is a flowchart 900 providing a process for determining a total active resource time for an evaluation period, according to an example embodiment. Further structural and operational examples will be apparent to persons skilled in the relevant art(s) based on the following descriptions. The example steps in flowchart 900 are described with respect to determining a total active resource time for an offering. Flowchart 900 is described as follows with respect to system 100 of FIG. 1 and system 200 of FIG. 2. In embodiments, one or more steps of flowchart 900 are not performed.

Flowchart 900 begins with step 902. In step 902, a request for determining a total active resource time for an offering is received. For example, system 200 of FIG. 2 may receive an external request via communication interface 202, may receive the request through a GUI of system 200, or may perform the determination as a routine evaluation. In embodiments, the request is received concurrently with, separately from, or subsequently to receiving the incident log in step 802 of flowchart 800 as described with respect to FIG. 8. In some embodiments, step 902 is a subsequent step to one or more steps of flowchart 800.

In step 904, it is determined if there is service level indicator (SLI) data available for the offering. For example, rate manager 206 determines if there is SLI data for the offering associated with the request received in step 902 from resource identification 232. In embodiments, rate manager 206 queries components of system 200 and/or components external to system 200 for SLI data. In some embodiments, the existence of SLI data is indicated in the request received in step 902. In response to determining there is SLI data available, flowchart 900 proceeds to step 906. In response to determining there is no SLI data available, flowchart 900 proceeds to step 908.

In step 906, a count of active resources associated with the offering is captured via requests using SLI data. For example, interruption rate calculator 222 or interruption duration rate calculator 224 may capture the count of active resources for the offering. In embodiments, SLI data are stored within a database component of system 200 or a database external to system 200. In some embodiments, SLI data for the offering is included in the request received in step 902.

In step 908, usage data is aggregated for active resources associated with the offering. For example, rate manager 206 analyzes service usage data for resource stored in data storage(s) 230. In embodiments, service usage data represent a daily aggregate of active resources that logged a signal at a billing meter. For example, in an embodiment, system monitor 210 monitors signals logged by active resources and stores this information in a service usage log of system 200. In some embodiments, step 908 is performed prior to, subsequent to, or concurrent with step 906 to capture available resources for offerings with incomplete SLI data.

In step 910, SLI data and usage data for the offering are aggregated by subscription, resource, and date. For example, rate manager 206 aggregates data determined in step 906 and/or step 908 by subscription ID, resource ID, and/or date of occurrence. In embodiments, SLI and/or usage data is aggregated by other IDs or criteria (e.g., factors described with respect to segment selection in flowchart 600 of FIG. 6, or filter criteria of incident filter 220 of FIG. 2) in addition to or in place of IDs described with respect to step 910. As examples, data determined for a fleet may be aggregated by offering ID and date of occurrence, data determined for a region may be aggregated by offering ID, region ID, and date of occurrence, and data determined for a customer may be aggregated by offering ID, customer ID, region ID, and date of occurrence. However, it is contemplated herein that data determined in steps 906 and/or 908 may be aggregated according to any combination of IDs or other criteria, as described herein and/or as would be understood by a person of ordinary skill in the relevant art(s) having the benefit of this disclosure.

In step 912, it is determined if information is missing or anomalous for a day. For example, rate manager 206 may determine SLI data and/or service usage data is missing for a particular day associated with the request received in step 902. For instance, if the request received in step 902 specifies a range of dates for evaluation, rate manager 206 may check if there is SLI data and/or service usage data for each date in that range. While the example illustrated in FIG. 9 specifies a length of time as a day, other units of time may be used (e.g., hours, weeks, months, quarters, years, and/or the like). In the context of flowchart 900, anomalous information with respect to step 912 may be indicated by a threshold amount of hours with no SLI data and/or service usage data, a corrupted file, incomplete data, misattributed information, and/or the like. If missing or anomalous information is detected for a day, flowchart 900 proceeds to step 914. If no missing or anomalous information is detected for a day, flowchart 900 proceeds to step 916.

In step 914, for dates with missing or anomalous information, a median resource count of the month is determined based on three standard deviations. For example, rate manager 206 may determine a date is missing information, determine a median resource count for the month that date occurred, and use the determined median resource count as the resource count for that day. In embodiments, a median resource count is determined for timespans other than one month (e.g., one or more days, weeks, months, quarters, years, and/or the like). Further, while the example described with respect to step 914 determines the median resource count based on three standard deviations, other deviation amounts may be used.

In step 916, the total active resource time for the offering associated with the request received in step 902 is determined. For example, rate manager 206 may determine the total active resource time from the information aggregated in step 910 and/or the calculations made in step 914. In embodiments, the total active resource time is divided into one or more subsets based on one or more temporal factors, spatial factors, logical factors, and/or the like. For example, in an embodiment, a set of total active resource times is provided for each day in a month. Other sets of total active resource times may be provided for other lengths of times (e.g., one or more hours, days, weeks, months, quarters, years, decades, and/or the like). In some embodiments, the total active resource time is an estimated active resource time. For example, with respect to step 908, usage data may indicate a resource was active at some point in a day; however, in some cases, it may not indicate how long the resource was active that day. Further, with respect to step 914, missing or anomalous day's may use an estimate to fill in gaps in data.

Thus, steps for determining total active resource time for an offering have been described with respect to flowchart 900. It is contemplated herein that total active resource times may be determined using similar steps for one or more fleets, customers, regions, resources, resource clusters, subscriptions, and/or the like. In an example, data aggregated in step 910 is grouped by customer ID for determining total active resource times for resources of respective customers.

Figure 10:
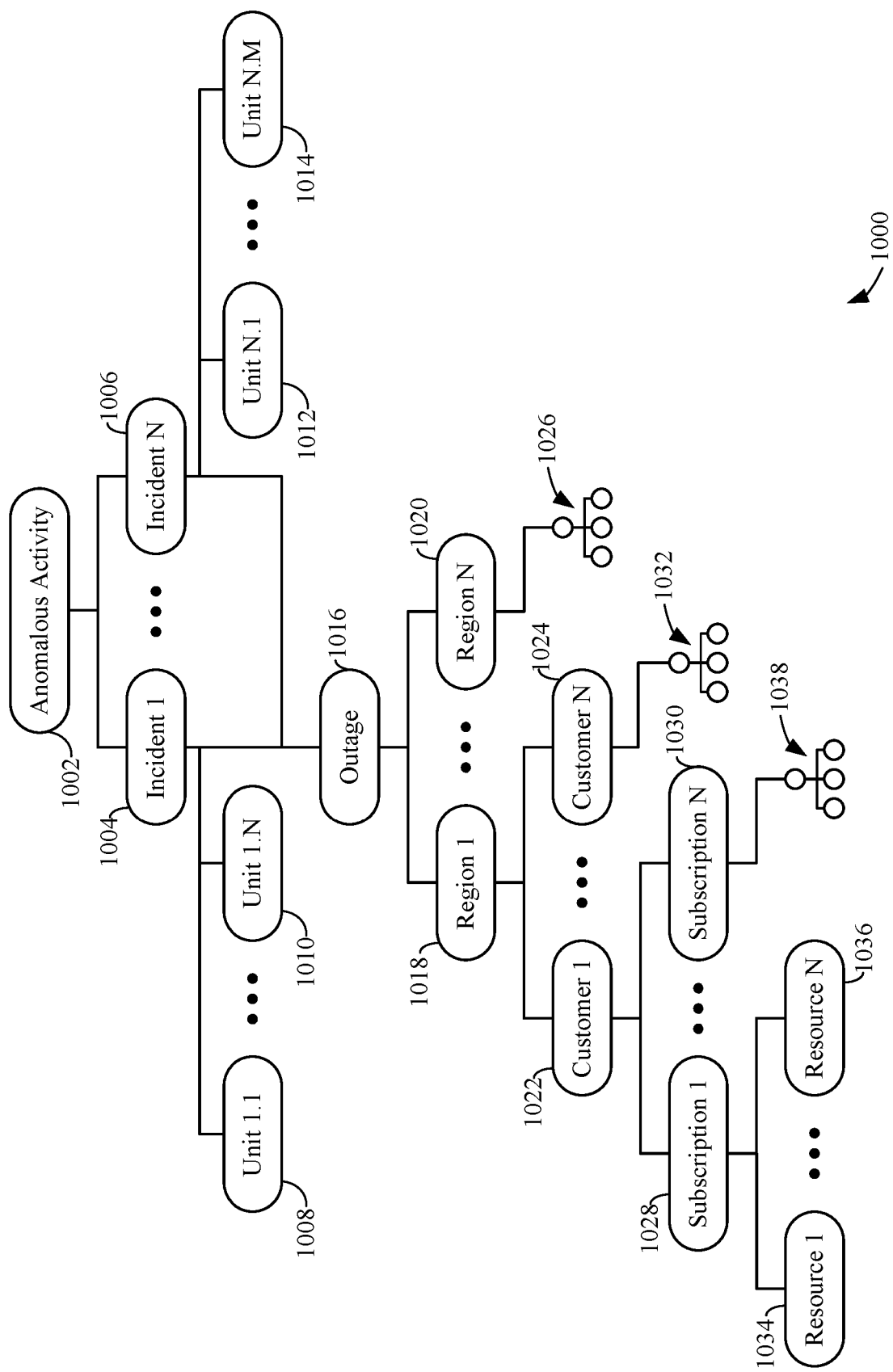
FIG. 10 is a diagram of an interruption hierarchy for understanding techniques for classifying incidents, according to an example embodiment.

As described above, incident logs may include respective impact data, which may be represented in various ways. FIG. 10 is a diagram of an interruption hierarchy 1000 ("diagram 1000" herein) for understanding techniques for classifying incidents, according to an example embodiment. Further structural and operational examples will be apparent to persons skilled in the relevant art(s) based on the following descriptions. Diagram 1000 is described as follows with respect to system 200 of FIG. 2.

Diagram 1000 as illustrated details how anomalous activity may be classified as one or more incidents, for example by incident classifier 214 of system 200 in FIG. 2. Anomalous activity classifications may include tiers of one or more anomalous activities, incidents, incident units, outages, regions, resources, subscriptions, customers, and/or the like (e.g., fleets, offerings, clusters, as described herein). For instance, in diagram 1000, anomalous activity 1002 is determined to be outside a predetermined limit and is associated with both incident 1004 and incident 1006. Incidents 1004 and 1006 are each associated with respective resource units 1008, 1010, 1012, and 1014. In this example, incidents 1004 and 1006 are attributed to an outage 1016.

Outage 1016 may include additional hierarchical information. This hierarchical information may pertain to one or more incidents (e.g., incident 1004 and/or incident 1006) associated with anomalous activity 1002 or it may pertain to other anomalous activity or reports determined to be associated with outage 1016. Sub-nodes of outage 1016 may include one or more regions (e.g., regions 1018 and 1020), customers (e.g., customers 1022 and 1024), subscriptions (e.g., subscriptions 1028 and 1030), resources (e.g., resources 1034 and 1036), and/or the like (e.g., fleets, clusters, or offerings).

In FIG. 10, region 1020, customer 1024, and subscription 1030 are shown with respective simplified sub-hierarchies 1026, 1032, and 1038 for brevity; however, it should be understood that these sub-hierarchies may be similar to those shown for region 1018, customer 1022, and subscription 1028, respectively. Hierarchies of anomalous activities may contain additional or fewer tiers than those shown in diagram 1000 as described herein or as otherwise would be understood by persons of skill in the relevant art(s) having the benefit of this disclosure, in embodiments. In some embodiments, tiers are reordered or otherwise reorganized. Further, different branches of tiers may include sub-hierarchies that differ from other branches. For example, as shown in FIG. 10, region 1018 is associated with respective customers, subscriptions, and resources; however, region 1020, for example, may be associated with one or more resources that are not associated with a customer or subscription (e.g., resources that have yet to be assigned a customer or subscription, resources that have been phased out, or resources that are undergoing maintenance).

Thus, example classifications of anomalous activity, incidents, and/or outages and their relationships have been described with respect to diagram 1000 of FIG. 10. In embodiments, hierarchies such as diagram 1000 are used to identify incident logs to be evaluated for interruption rate calculations (e.g., by interruption rate calculator 222 or interruption duration rate calculator 224 of system 200 as described with respect to FIG. 2). For instance, incident logs may be identified using associated impact node IDs. As an example, incident logs related to customer 1024 and unit 1008 of incident 1004 may be identified by an outage-unit-region-customer impact node ID labeled "Outage-Unit 1.1-Region 1-Customer N". In embodiments, monitoring and incident managing systems (e.g., system 200 of FIG. 2) use such impact node IDs to intelligently evaluate outages and manage insights.

Figure 11:
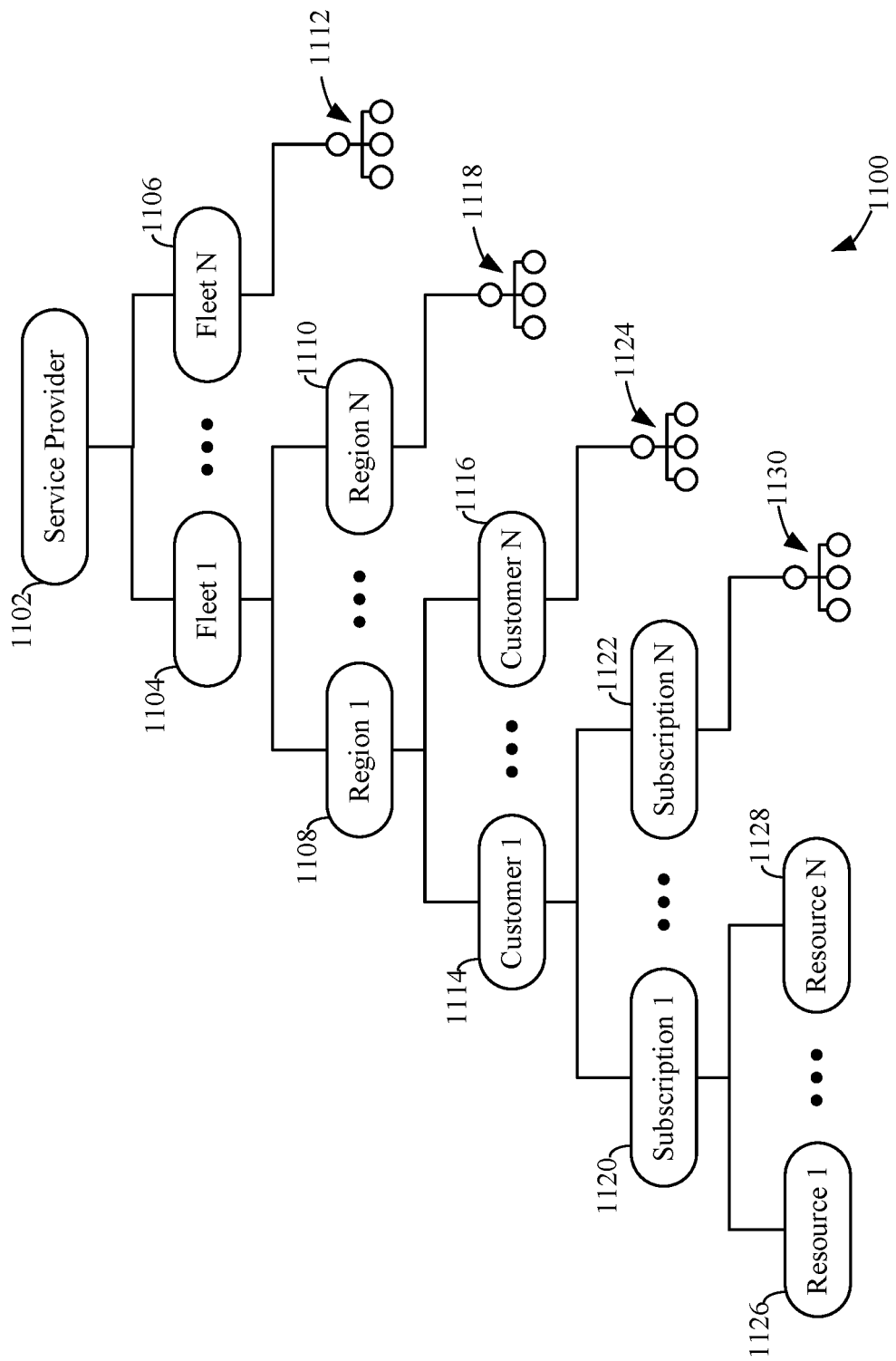
FIG. 11 is a diagram of a resource hierarchy for understanding techniques for segmenting resources, according to an example embodiment.

As described above, resources may be grouped according to one or more factors, which may be represented in various ways. For instance, FIG. 11 is a diagram of a resource hierarchy 1100 ("diagram 1100" herein) for understanding techniques for segmenting resources, according to an example embodiment. Further structural and operational examples will be apparent to persons skilled in the relevant art(s) based on the following descriptions. Diagram 1100 is described as follows with respect to system 100 of FIG. 1 and system 200 of FIG. 2.

Diagram 1100 as illustrated details a hierarchy of segments of resources in a cloud computing service network system. For example, a service provider 1102 manages the cloud computing service network system. The cloud computing service network system may include one or more fleets, where a fleet is representative of an offering in a particular time period. For example, as shown in FIG. 11, the cloud computing service network system managed by service provider 1102 includes fleet 1104 and fleet 1106. Each fleet may be associated with one or more regions (e.g., regions 1108 and 1110), customers (e.g., customers 1114 and 1116), subscriptions (e.g., subscriptions 1120 and 1122), resources (e.g., resources 1126 and 1128), and/or the like (e.g., resource units, clusters, or offerings).

In FIG. 11, fleet 1106, region 1110, customer 1116, and subscription 1122 are shown with respective simplified sub-hierarchies 1112, 1118, 1124, and 1130 for brevity; however, it should be understood that these sub-hierarchies may be similar to those shown for fleet 1104, region 1108, customer 1114, and subscription 1120, respectively. Hierarchies of segments may contain additional or fewer tiers than those shown in diagram 1100 as described herein or as otherwise would be understood by persons of skill in the relevant art(s) having the benefit of this disclosure, in embodiments. Further, different branches of tiers may include sub-hierarchies that differ from other branches. For example, as shown in FIG. 11, region 1108 is associated with respective customers, subscriptions, and resources; however, region 1110, for example, may be associated with one or more resources that are not associated with a customer or subscription.

Thus, an example hierarchy of a cloud computing service network system has been described with respect to diagram 1100 of FIG. 11. In embodiments, hierarchies such as diagram 1100 are used to determine available resources for calculating a total active resource time (e.g., by interruption rate calculator 222 or interruption duration rate calculator 224 of system 200 as described with respect to FIG. 2). For instance, available resources may be determined based on resource node IDs. As an example, resource 1126 may be identified by a fleet-region-customer-subscription resource node ID labeled "Fleet 1-Region 1-Customer 1-Subscription 1-Resource 1". In embodiments, monitoring and incident managing systems (e.g., system 200 of FIG. 2) use such resource node IDs to intelligently evaluate outages and manage insights.

Figure 12:
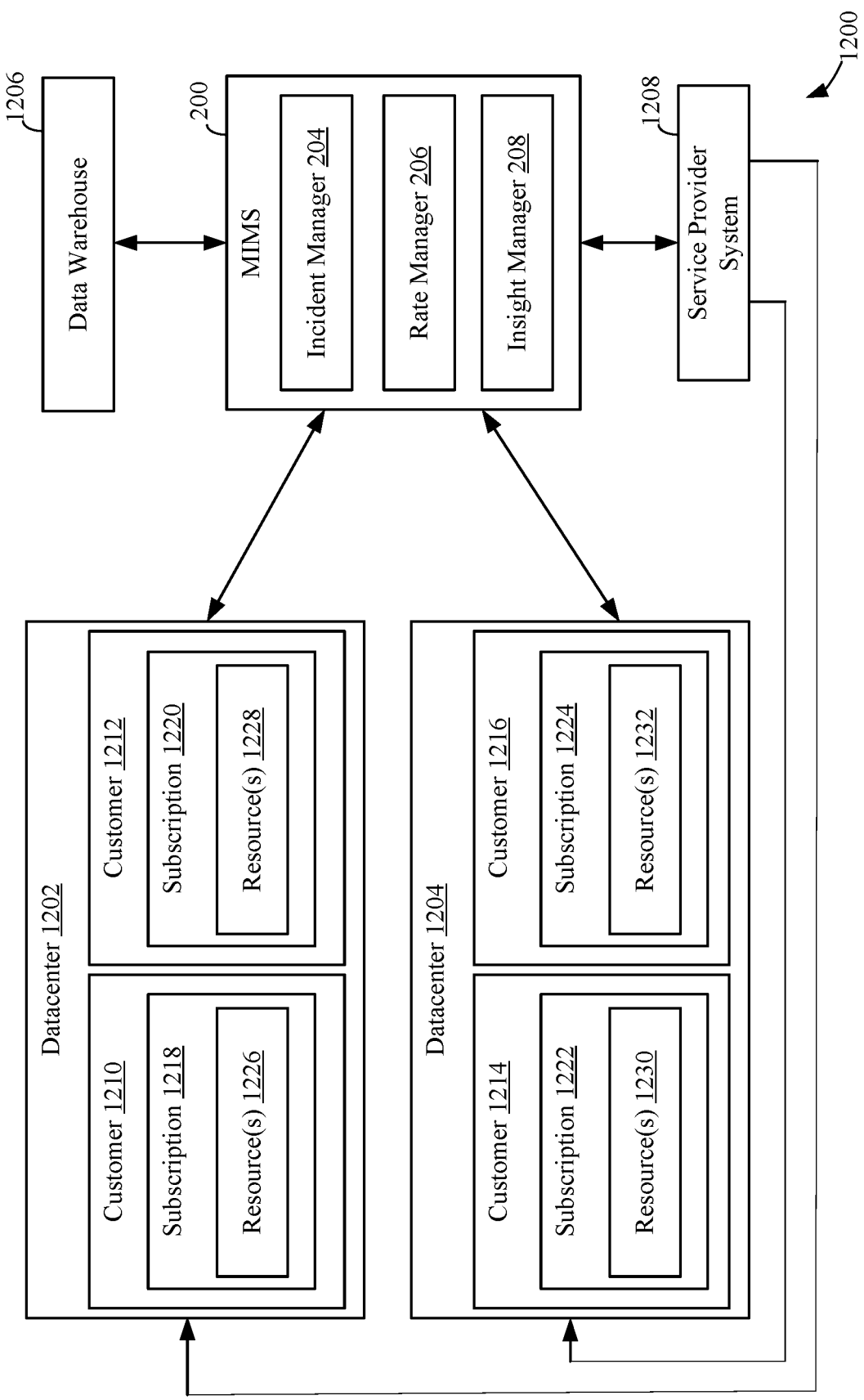
FIG. 12 is a block diagram of a cloud computing service network system configured for intelligent outage evaluation and insight management, according to an example embodiment.

As described above, intelligent outage evaluation and insight management may be implemented in various manners. For example, FIG. 12 is a block diagram of a cloud computing service network system 1200 ("system 1200" herein) configured for intelligent outage evaluation and insight management, according to an example embodiment. In embodiments, system 1200 operates similar to system 100 of FIG. 1. As shown in FIG. 12, system 1200 includes a plurality of datacenters 1202 and 1204, a data warehouse 1206, system 200 of FIG. 2, and a service provider system 1208. Datacenters 1202 and 1204, data warehouse 1206, system 200, and service provider 1208 may communicate with one another via external and/or internal communication networks. The external and/or internal communication networks may comprise one or more networks such as local area networks (LANs), wide area networks (WANs), enterprise networks, the Internet, etc., and may include one or more of wired and/or wireless portions.

In embodiments, datacenters 1202 and 1204 (and any number of additional datacenters) are associated with one or more regions serviced by system 1200. For example, datacenter 1202 may be associated with a first region and datacenter 1204 may be associated with a second region. In another example, datacenters 1202 and/or 1204 may include be associated with multiple respective regions. In another example, datacenters 1202 and 1204 are associated with the same region. The respective regions associated with datacenters 1202 and/or 1204 may be classified according to respective hierarchies, such as the hierarchy described with respect to diagram 1100 of FIG. 11. Each of datacenters 1202 and 1204 may be associated with one or more customers. For example, as shown in FIG. 12, datacenter 1202 is associated with customers 1210 and 1212, and datacenter 1204 is associated with customers 1214 and 1216. Each of customers 1210, 1212, 1214, and 1216 may be subscribed to one or more subscriptions of one or more resources (e.g., subscription 1218 to resource(s) 1226, subscription 1220 to resource(s) 1228, subscription 1222 to resource(s) 1230, and subscription 1224 to resource(s) 1232, respectively).

System 1200, datacenters 1202 and 1204, and associated customers and resources may include additional datacenters, customers, and/or resources (not shown for brevity and illustrative clarity). For example, a customer may be subscribed to multiple subscriptions. Further, a datacenter may be associated with more than one system (e.g., a third-party datacenter managing resources of multiple system providers), a customer may be associated with more than one datacenter (e.g., a customer operating in more than one region or a customer associated with more than one fleet), a subscription may be associated with more than one customer (e.g., a jointly owned subscription), and a resource may be associated with more than one subscription (e.g., a shared resource). In embodiments, a datacenter includes resources associated with one or more offerings.

In embodiments, datacenters 1202 and 1204 may receive data from computing devices of respective customers or resources. For example, datacenter 1202 may receive requests, telemetric data, storage information, usage data, status updates, reports, and/or the like from computing devices of customer 1210, computing devices of customer 1212, resource(s) 1226, and/or resource(s) 1228, and datacenter 1204 may receive similar data from computing devices of customer 1214, computing devices of customer 1216, resource(s) 1230, and/or resource(s) 1232. In some embodiments, each of datacenters 1202 and 1204 include multiple sub-datacenters, each sub-datacenter corresponding to respective one or more fleets, offerings, regions, customers, subscriptions, clusters, resources, and/or the like. In this context, sub-datacenters may be arranged in a variety of ways. For example, a first sub-datacenter may correspond to customer 1210, a second sub-datacenter may correspond to customer 1212, and a third sub-datacenter may correspond to customers 1214 and 1216. Datacenter 1202, datacenter 1204, and/or corresponding sub-datacenters may be organized in manners as described with respect to servers of resource sets 116 and 118 of FIG. 1, or as otherwise understood by a person of ordinary skill(s) in the relevant art(s).

As noted above, system 1200 may include data warehouse 1206, in embodiments. Data warehouse 1206 may include one or more servers, datacenters, memory devices, and/or the like. Data warehouse 1206 may be configured to store data in various forms, such as database(s), lists, unstructured data storage, and/or the like. In an example embodiment, data warehouse 1206 is distributed across multiple datacenters and/or sub-datacenters. In an example embodiment, data warehouse 1206 is a further embodiment of data storage(s) 230 of system 200 as described with respect to FIG. 2.

As noted above, system 1200 may include a MIMS such as system 200 of FIG. 2. System 200 may receive information from datacenter 1202, datacenter 1204, data warehouse 1206, and/or service provider system 1208 as part of its operation as described with respect to FIG. 2. For example, incident manager 204 may receive telemetric data from datacenters 1202 and/or 1204, store incident logs in data warehouse 1206, and communicate to service provider system 1208 and/or customers 1210, 1212, 1214, and/or 1216. Rate Manager 206 may receive incident logs and resource information stored in data warehouse 1206. Insight manager 208 may receive interruption rates and/or interruption duration rates stored in data warehouse 1206 and provide actionable insights to service provider system 1208 and/or customers 1210, 1212, 1214, and/or 1216.

Service provider system 1208 may be configured to manage system 1200. Service provider system 1208 may include components such as, user interfaces (e.g., graphic user interfaces or text-based interfaces), processing systems, volatile memory devices (e.g., random access memory (RAM) and/or the like), non-volatile memory devices (e.g., hard drives, non-volatile RAM, and/or the like), communication interfaces, and/or additional components related to the operation of system 1200.

Service provider system 1208 may be configured as an interface between system 200 and customers 1210, 1212, 1214, and 1216, according to embodiments. For example, incident manager 204 of system 200 may prepare communication reports regarding identified incidents impacting resources used by customers (e.g., resource(s) 1226, 1228, 1230, and 1232). In this context, incident manager 204 may send the communication reports to service provider system 1208 for distribution to customers 1210, 1212, 1214, and/or 1216. In embodiments, system 200 sends information regarding the identified incidents to service provider system 1208. In this context, service provider system 1208 may prepare communication reports to be distributed to customers 1210, 1212, 1214, and/or 1216.

In embodiments, service provider system 1208 is further configured to send requests to system 200. For example, service provider system 1208 may request system 200 to evaluate interruption rates for a group of resources based on one or more IDs associated with incidents or the group of resources. Service provider system 1208 may generate this request automatically (e.g., as part of a periodic process, as part of a system update, or in response to changes in one or more fleets) or manually (e.g., in response to a request from a customer device, in response to an input from a service team, or in response to an input from the service provider).

System 1200 also includes additional components (not shown for brevity and illustrative clarity) including components and subcomponents of other devices and/or systems herein, such as those described above with respect to FIGS. 1 and 2 or below with respect to FIG. 17, including software such as an operating system (OS), according to embodiments.

Thus, embodiments of a cloud computing service network have been described with respect to system 1200 of FIG. 12. Though datacenter 1202, datacenter 1204, data warehouse 1206, system 200, and service provider system 1208 have been shown and described as separate from each other, any number of such systems or subcomponents may be combined. For example, system 200 and/or service provider 1208 may be included in one or more nodes in one or more of resource(s) 1226, 1228, 1230, and/or 1232. In embodiments, one or more of system 200, datacenter 1202, datacenter 1204, a corresponding sub-datacenter, data warehouse 1206, and/or service provider system 1208 are incorporated in the same physical location. System 200 and/or service provider system 1208 may be incorporated in any type of stationary or mobile computing device(s) described elsewhere herein or otherwise known.

Figures 13, 14:
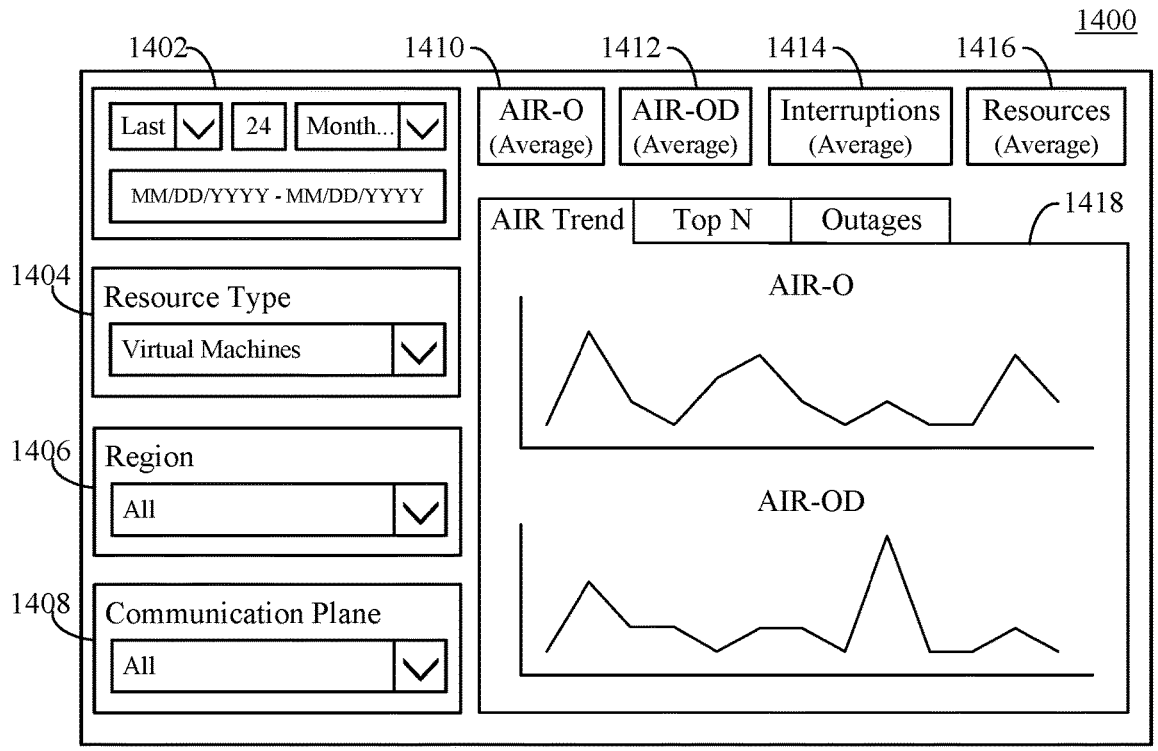
FIG. 13 is a diagram of interruptions across a review period for understanding outage evaluation and insight management techniques described herein, according to an example embodiment.
FIG. 14 is an example reporting dashboard graphic user interface for providing interruption rate data indicative of outage evaluation and insight management, according to an example embodiment.

In embodiments, interruption rates and interruption duration rates are evaluated in various ways. For instance, FIG. 13 is a diagram of interruptions across a review period 1300 ("diagram 1300" herein) for understanding outage evaluation and insight management techniques described herein. Further structural and operational examples will be apparent to persons skilled in the relevant art(s) based on the following descriptions. Diagram 1300 is described as follows with respect to system 200 of FIG. 2.

Diagram 1300 as illustrated shows a set of resources 1302, a set of days 1304, a set of incidents 1306, a set of outages 1308, a set of calculations 1310, and a set of averages 1312. Diagram 1300, as illustrated, shows an example of interruption rate calculations for set of resources 1302 (labeled "Resource 1", "Resource 2", "Resource 3", "Resource 4", "Resource 5", "Resource 6", and "Resource N" herein) over set of days 1304 (labeled "Day 1", "Day 2", "Day 3", "Day 4", "Day 5", and "Day 6" herein). Note that, in the example of FIG. 13, the variable "N" of Resource N is equal to 1,150 resources; however, other implementations may evaluate other numbers of resources.

In the context of the example, system monitor 210 as described with respect to FIG. 2 receives information from set of resources 1302. Incident detector 212 detects anomalous activity, if any, among the received information. On Day 1, no anomalous activity was detected.

On Day 2, incident detector 212 detects anomalous activity indicating one or more incidents of set of incidents 1306. Incident classifier 214 determines the one or more incidents impacted Resource 1, Resource 2, Resource 5, and Resource N. Incident classifier 214 also associates the one or more incidents with an outage of set of outages 1308, labeled "Outage 1." In this context, incident classifier 214 may generate one or more incident logs. For example, incident logs may be generated individually for each incident, generated for incidents grouped by one or more IDs, or for Outage 1. Incident communicator 216 stores the one or more incident logs as incident log(s) 234.

On Day 3, incident detector 212 detects anomalous activity indicating one or more incidents of set of incidents 1306. Incident classifier 214 determines the one or more incidents impacted Resource 2, Resource 3, Resource 4, Resource 5, and Resource 6. Incident classifier 214 also associates the one or more incidents with an outage of set of outages 1308, labeled "Outage 2," and generates one or more incident logs. Incident communicator 216 stores the one or more incident logs as incident log(s) 234. On Day 4, no anomalous activity was detected.

On Day 5, incident detector 212 detects anomalous activity indicating one or more incidents of set of incidents 1306. Incident classifier 214 determines the one or more incidents impacted Resource 4. Incident classifier 214 also associates the one or more incidents with an outage of set of outages 1308, labeled "Outage 3," and generates one or more incident logs. Incident communicator 216 stores the one or more incident logs as incident log(s) 234.

On Day 6, incident detector 212 detects anomalous activity indicating one or more incidents of set of incidents 1306. Incident classifier 214 determines the one or more incidents impacted Resource 1, Resource 2, Resource 3, Resource 4, Resource 5, Resource 6, and Resource N. Incident classifier 214 also associates the one or more incidents with an outage of set of outages 1308, labeled "Outage 4," and generates one or more incident logs. Incident communicator 216 stores the one or more incident logs as incident log(s) 234.

In the example of diagram 1300, interruption rates are determined with respect to set of outages 1308 and set of resources 1302 over set of days 1304 using set of calculations 1310. In this context, incident classifier 214 determines a respective time to mitigate (TTM) for each outage of set of outages 1308. Each TTM in diagram 1300 is shown in minutes. As shown in Diagram 1300, Outage 1 took 392 minutes to mitigate, Outage 2 took 70 minutes to mitigate, Outage 3 took 39 minutes to mitigate, and Outage 4 took 18 minutes to mitigate. Respective counts of resources impacted by each outage of set of outages 1308 are also determined. In the example shown in diagram 1300, only one interruption occurs per outage per resource for illustrative clarity; therefore, in this example, the count of resources impacted by each outage is representative of the interruption count for that outage. As shown in diagram 1300, 4 resources were impacted by Outage 1, 5 resources were impacted by Outage 2, 1 resource was impacted by Outage 3, and 7 resources were impacted by Outage 4.

Set of calculations 1310 include daily calculations of annual interruption rates due to outages, "AIR-O", and annual interruption duration rates due to outages, "AIR-OD." In embodiments, AIR-O may be determined using Equation 1 described with respect to FIG. 1 and AIR-OD may be determined using Equation 2. In the example of diagram 1300, each evaluation period is 1 day, the count of expected active resources during each evaluation period is 1,150 resources, and the scaling factor is 365 days per year. As shown in Diagram 1300, the determined AIR-O values for each day are: 0) interruptions per resource per year for Day 1, 1.27 interruptions per resource per year for Day 2, 1.59 interruptions per resource per year for Day 3, 0 interruptions per resource per year for Day 4, 0.32 interruptions per resource per year for Day 5, and 2.22 interruptions per resource per year for Day 6. Further, the determined AIR-OD values for each day are: 0 minutes per resource per year for Day 1, 497.7 minutes per resource per year for Day 2, 111.1 minutes per resource per year for Day 3, 0 minutes per resource per year for Day 4, 12.4 minutes per resource per year for Day 5, and 40 minutes per resource per year for Day 6.

Set of averages 1312 may be determined from set of calculations 1310. As shown in diagram 1300, for set of resources 1302 and set of days 1304, the average AIR-O is determined as 0.90 interruptions per resource per year and the average AIR-OD is determined as 110.2 minutes per resource per year.

Thus, an example for calculating AIR-O, AIR-OD, average AIR-O, and average AIR-OD values has been illustrated and described with respect to information shown in diagram 1300 of FIG. 13 and the operation of system 200 of FIG. 2. Implementations of embodiments described herein may perform similar calculations for any amount of resources, days, evaluation periods, outages, and scaling factors as described herein or as otherwise would be understood by persons of skill in the relevant art(s) having the benefit of this disclosure. For instance, an evaluated set of resources may be one or more resources associated with one or more customers, clusters, regions, subscriptions, offerings, fleets, and/or service provider systems. In diagram 1300, the evaluation periods are described in 24-hour days; however, other lengths of evaluation periods may be used. Further, in diagram 1300, the scaling factor is described as 365 days per year to scale respective evaluation periods to a scaled period of a year; however, other scaling factors may be used to scale evaluation periods to other lengths of scaled periods. In diagram 1300, a review period of 6 days is shown; however, other implementations may use other lengths of review periods. In diagram 1300, a count of resources impacted by the outages is used to represent an interruption count; however, other implementations may count interruptions directly or indirectly. For example, a system may be configured to generate or determine an interruption count representative of the number of interruptions on resources caused by outages where one or more resources are interrupted more than once by the same outage. In this context, the interruption count may differ from the count of resources impacted by outages.

III. Example Graphic User Interface Embodiments

As described above, MIMS may be configured in various ways to perform their described functions. For instance, a MIMS may be configured to provide interruption rate data indicative of outage evaluation and/or insight management using one or more GUIs. A GUI may include an offering overview, a fleet overview, a customer overview; and/or the like (e.g., a region overview, a system provider overview, or an outage overview). In embodiments, GUIs are implemented in a reporting dashboard that includes various input controls (e.g., text-based inputs, check boxes, radio buttons, or drop-down menus) and output controls (e.g., tables, graphs, text windows, or graphics). Input controls may be used for providing information to a service provider system (e.g., service provider system 1210 of FIG. 12) and/or a MIMS (e.g., MIMS 104 of FIG. 1 or system 200 of FIG. 2) for requesting information pertaining to the network managed by the service provider system. Input controls may be used for filtering displayed information by selecting evaluation periods, review periods, fleets, offerings, resource clusters, incidents, outages, customers, resource types, regions, and/or the like. Output controls may be used for displaying information to a user (e.g., AIR-O values, AIR-OD values, average AIR-O values, average AIR-OD values, trendlines, hot spots, contributing factors, causal factors, impacted resources, active resources, impacted customers, responsible service teams, and/or actionable insights).

Note that reporting dashboard GUIs may be implemented in various ways to perform their functions. For instance, FIG. 14 is an example embodiment of a reporting dashboard GUI ("dashboard 1400" herein) for providing interruption rate data indicative of outage evaluation and insight management, according to an example embodiment. Dashboard 1400 as exemplarily illustrated and described is configured to interface with a MIMS, such as MIMS 104 of FIG. 1 or system 200 of FIG. 2, in embodiments. Dashboard 1400 is described as follows.

Dashboard 1400 may include multiple input controls and/or output controls. As shown in FIG. 14, dashboard 1400 includes a review period selection window 1402, a resource type selection window 1404, a region selection window 1406, a communication plane selection window 1408, an average AIR-O display window 1410, an average AIR-OD display window 1412, an average interruption count display window 1414, an average resource count display window 1416, and a reporting display window 1418.

As discussed above, dashboard 1400 may include multiple selection windows, including review period selection window 1402, resource type selection window 1404, region selection window 1406, and communication plane selection window 1408. Implementations of reporting dashboard GUIs may include additional selection windows (not shown with respect to dashboard 1400 for brevity and illustrative clarity) such as offering selection windows, fleet selection windows, customer selection windows, resource cluster selection windows, datacenter selection windows, and/or the like.

Review period selection window 1402 may include input and output sub-controls. As shown in FIG. 14, review period selection window 1402 includes a first dropdown menu (with option "Last" selected), a text-based input (with "24" entered), a second dropdown menu (with "Month . . . " selected), and a review period display window (displayed in "MM/DD/YYYY-MM/DD/YYYY" format). In this example, the first dropdown menu may be used to select a temporal factor, such as "Last," corresponding to the most recent time period, "First," corresponding to the first recorded time period, and/or the like. The text-based input may be used to input a numerical amount. The second dropdown menu may be used to select a time scale, such as day, week, month, quarter, year, decade, and/or the like. The review period display window may display a review period corresponding to the inputs of the first dropdown menu, the text-based input, and the second dropdown menu. For example, as shown in FIG. 14, the review period display window would show a date range starting with a date 24 months before today and ending with today.

As noted above, review period selection window 1402 may be implemented in a variety of ways. The input sub-controls of review period selection window 1402 may be one or more text-based inputs, dropdown menus, checkboxes, radio buttons, or graphic selection windows. For instance, the text-based input with "24" entered in FIG. 14 may be replaced with a dropdown menu. In an embodiment, review period selection window 1402 is two date selection inputs for selecting a starting date and an ending date.

As noted above, dashboard 1400 may include resource type selection window 1404, region selection window 1406, and communication plane selection window 1408, in embodiments. These selection windows may be implemented as various input controls of dashboard 1400. As shown in FIG. 14, resource type selection window 1404, region selection window 1406, and communication plane selection window 1408 are dropdown menus; however, other types of input controls may be used. Further, the selection windows may be configured to allow a single input choice or multiple input choices, in embodiments.

As noted above, dashboard 1400 may include an average AIR-O display window 1410, an average AIR-OD display window 1412, an average interruption count display window 1414, an average resource count display window 1416. These display windows may be implemented as various output controls of dashboard 1400. For example, the display windows may be implemented as text windows displaying respective averages; however, other output control types may be used. For instance, average resource count display window 1416 may be configured as a text window or graphic that shows an average percentage of resources available out of all resources associated with selections made in review period selection window 1402, resource type selection window 1404, region selection window 1406, and communication plane selection window 1408.

Reporting display window 1418 may include various texts, graphs, and/or graphics related to selections made in dashboard 1400. As illustrated in FIG. 14, reporting display window 1418 is showing determined AIR-O and AIR-OD values for each day in the review period selected in review period selection window 1402 for the resources associated with selections made in resource type selection window 1404, region selection window 1406, and communication plane selection window 1408. Reporting display window 1418 may include one or more sub-windows, in embodiments. For example, in FIG. 14, reporting window 1418 includes a first sub-window labeled "AIR Trend," a second sub-window labeled "Top N," and a third sub-window labeled "Outages." Sub-window AIR Trend sub-window shows the trends of AIR-O and AIR-OD values for the review period. Sub-window Top N may show customers, offerings, fleets, regions, resource clusters, or subscriptions with the highest average AIR-O and/or AIR-OD values for the review period, where "N" is a variable with a numeric value. In some embodiments, the value of N is selected in a selection window of dashboard 1400 or in a sub-control of sub-window Top N. Sub-window Outages may display a list of outages associated with selections made in dashboard 1400 and/or information associated with the list of outages. In embodiments, reporting display window 1418 includes additional sub-windows for displaying information related to outage evaluation and insight management. As shown in FIG. 14, these sub-windows are in separate selectable tabs of reporting display window 1418. In other implementations, sub-windows may be displayed simultaneously or may be selected from another input method (e.g., via a dropdown menu, a selection of radio buttons, or a selection of checkboxes).

Figure 15:
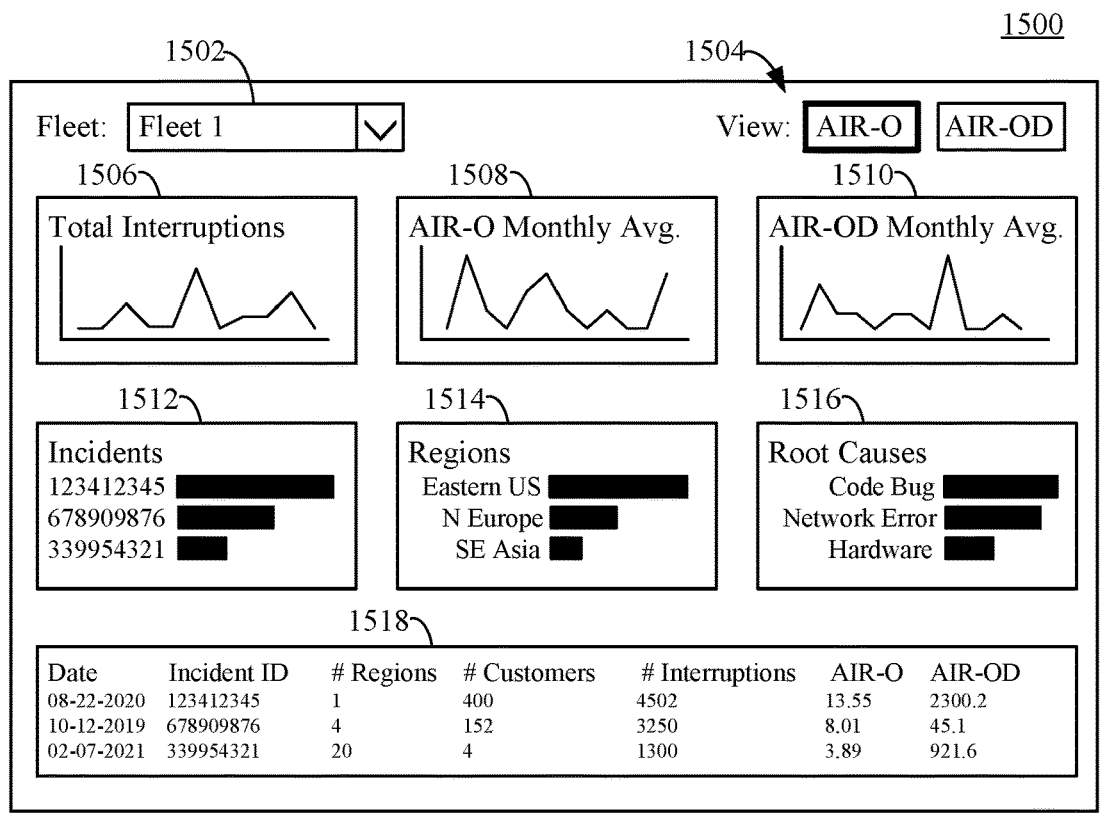
FIG. 15 is an example reporting dashboard graphic user interface for providing interruption rate and incident log data indicative of outage evaluation and insight management for a fleet, according to an example embodiment.

In embodiments, GUIs also provide interruption rate and incident log data for a fleet of resources. For instance, FIG. 15 is an example embodiment of a reporting dashboard GUI ("dashboard 1500" herein) for providing interruption rate and incident log data indicative of outage evaluation and insight management for a fleet, according to an example embodiment. Dashboard 1500 as exemplarily illustrated and described is configured to interface with a MIMS, such as MIMS 104 of FIG. 1 or system 200 of FIG. 2, in embodiments. In some embodiments, dashboard 1500 is configured as a subcomponent of dashboard 1400 of FIG. 14. Dashboard 1500 is described as follows.

Dashboard 1500 may include multiple input controls and/or output controls. As shown in FIG. 15, dashboard 1500 includes a fleet selection window 1502, a view selection window 1504, an interruption display window 1506, an average AIR-O display window 1508, an average AIR-OD display window 1510, an incident display window 1512, a region display window 1514, a root cause display window 1516, and incident log display window 1518.

As discussed above, dashboard 1500 may include one or more selection windows for providing inputs to the dashboard. As illustrated in FIG. 15, dashboard 1500 includes fleet selection window 1502 and view selection window 1504. Fleet selection window 1502 may be used to select which fleet to evaluate. In FIG. 15, fleet selection window 1502 is shown as a dropdown menu with "Fleet 1" selected; however, other types of input controls may be used. View selection window 1504 may be used to focus displayed information with respect to either AIR-O or AIR-OD calculations. In FIG. 15, view selection window 1504 is shown as selectable buttons with "AIR-O" selected; however, other types of input controls may be used. In embodiments, the information displayed in display windows of dashboard 1500 updates as selections are made in the one or more selection windows.

As discussed above, dashboard 1500 may include one or more display windows for displaying interruption rate and incident log data indicative of outage evaluation and insight management associated with selections made in the one or more selection windows. As illustrated in FIG. 15, dashboard 1500 includes interruption display window 1506, average AIR-O display window 1508, average AIR-OD display window 1510, incident display window 1512, region display window 1514, root cause display window 1516, and incident log display window 1518. Interruption display window 1506 shows a graph of the total interruptions per month over a review period for the selected fleet. Average AIR-O display window 1508 shows a graph of the monthly average AIR-O values over a review period for the selected fleet. Average AIR-OD display window 1510 shows a graph of the monthly average AIR-OD values over a review period for the selected fleet. In some embodiments, the graphs include a trendline for their respective data.

Incident display window 1512 may be configured to show a list of incidents and corresponding AIR-O values associated with the selected fleet, in embodiments. Incident display window shows information associated with incidents labeled "123412345," "678909876," and "339954321." In embodiments, the AIR-O values are displayed in graphic or text form. For instance, as shown in FIG. 15, the average AIR-O values for the listed incidents are shown as a bar graphic. In this example, incidents are organized by average AIR-O values in descending order. In embodiments, if "AIR-OD" is selected in view selection window 1504, corresponding AIR-OD values are shown for each incident instead of AIR-O values. In some embodiments, both AIR-O and AIR-OD values are shown.

Region display window 1514 and root cause display window 1516 may be configured similar to incident display window 1512, in embodiments. For example, region display window 1514 shows a list of regions and corresponding AIR-O values associated with the selected fleet, and root cause display window 1516 shows a list of root causes and corresponding AIR-O values associated with the selected fleet. As shown in FIG. 15, region display window 1514 shows information associated with regions labeled "Eastern US," "N Europe," and "SE Asia;" however, other regions may be included as well. As shown in FIG. 15, root cause display window 1516 shows information associated with root causes labeled "code bug." "network error," and "hardware;" however, other root causes may be included as well in different granularities. Similar to incident display window 1518, region display window 1514 and root cause display window 1516 may display AIR-OD values instead of or in addition to AIR-O values. For instance, as illustrated in FIG. 15, if "AIR-OD" is selected in view selection window 1504, AIR-OD values would be displayed instead of AIR-O values.

Incident log display window 1518 may be configured to display information related to incidents associated with the selected fleet, in embodiments. For example, incident log display window 1518 shows information associated with incidents displayed in incident display window 1512. As shown in FIG. 15, incident log display window 1518 includes several columns of data for each incident log including the date the incident occurred, the incident ID, the number of regions impacted by the incident, the number of customers impacted by the incident, the number of interruptions associated with the incident, and determined AIR-O and AIR-OD values. Incident log display window 1518 may include additional columns (not shown for brevity and illustrative clarity), such as a hyperlink (e.g., to a webpage or database containing additional information for the incident), the communication plane the incident impacted (e.g., a data plane or a control plane), the number of subscriptions impacted by the incident, the number of customers and/or subscriptions communicated to regarding the incident, the number of fleet resources available on the date the incident occurred, the time to mitigate (TTM) the incident, the service provider tenant associated with the incident, the service team associated with the incident, the resource types impacted by the incident, the incident type, and/or the like.

In some embodiments, incident display window 1512, region display window 1514, root cause display window 1516, and/or incident log display window 1518 are interactive windows. For example, a user may select an incident displayed in incident display window 1512 and the other display windows of dashboard 1500 may update their information accordingly. In a first example, if a user selects incident 123412345 in incident display window 1512, region display window 1514 highlights portions of its displayed information associated with incident 123412345, root cause display window 1516 highlights portions of its displayed information associated with incident 123412345, and incident log display window 1518 filters out information not associated with incident 123412345. In this context, region display window 1514 and/or root cause display window 1516 may reorganize their displayed information in descending order with respect to incident 123412345. In a second example, if a user selects the Eastern US region in region display window 1514, interruption display window 1506 shows a graph of the total interruptions per month over a review period for the selected fleet in the Eastern US region, average AIR-O display window 1508 shows a graph of the monthly average AIR-O values over a review period for the selected fleet in the Eastern US region, average AIR-OD display window 1510 shows a graph of the monthly average AIR-OD values over a review period for the selected fleet in the Eastern US region, incident display window 1512 highlights portions of its displayed information associated with the Eastern US region, root cause display window 1516 highlights portions of its displayed information associated with the Eastern US region, and incident log display window 1518 filters out information not associated with the Eastern US region.

Thus, an example reporting dashboard GUI for providing interruption rate and incident log data indicative of outage evaluation and insight management for a fleet has been illustrated and described, according to an example embodiment. Dashboard 1500 may include additional selection windows and/or display windows (not shown for brevity and illustrative clarity) in addition to or in place of those shown in FIG. 15. For instance, additional selection windows of dashboard 1500 may include review period selection windows, region selection windows, customer selection windows, resource cluster selection windows, and/or the like. Further, additional display windows of dashboard 1500 may include communication plane display windows, monitoring system display windows, responsible service provider tenant display windows, customer display windows, and/or the like.

Figure 16:
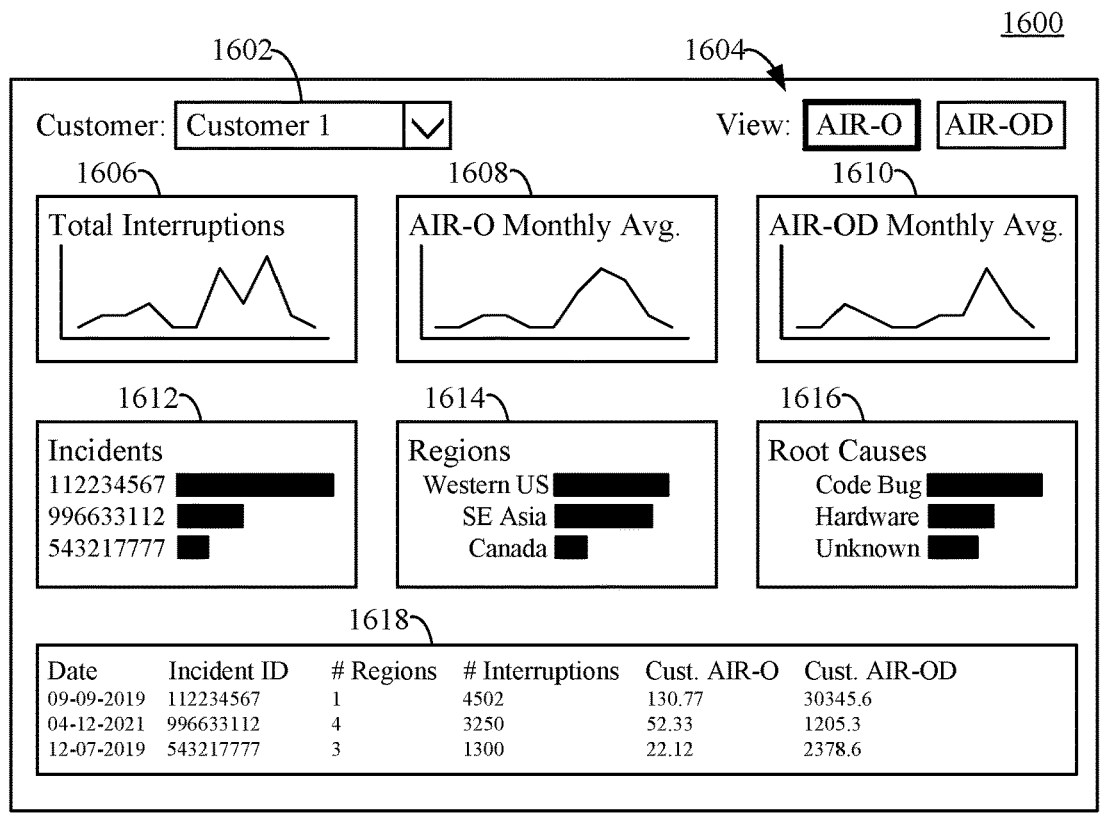
FIG. 16 is an example reporting dashboard graphic user interface for providing interruption rate and incident log data indicative of outage evaluation and insight management for a customer, according to an example embodiment.

In embodiments, GUIs also provide interruption rate and incident log data for resources associated with a customer. For instance, FIG. 16 is an example embodiment of a reporting dashboard GUI for providing interruption rate and incident log data indicative of outage evaluation and insight management for a customer, according to an example embodiment. Dashboard 1600 as exemplarily illustrated and described is configured to interface with a MIMS, such as MIMS 104 of FIG. 1 or system 200 of FIG. 2, in embodiments. In some embodiments, dashboard 1600 is configured as a sub-component of dashboard 1400 of FIG. 14 or dashboard 1500 of FIG. 15. Dashboard 1600 is described as follows.

Dashboard 1600 may include multiple input controls and/or output controls, similar to those described with respect to dashboard 1500. As shown in FIG. 16, dashboard 1600 includes a customer selection window 1602, a view selection window 1604, an interruption display window 1606, an average AIR-O display window 1608, an average AIR-OD display window 1610, an incident display window 1612, a region display window 1614, a root cause display window 1616, and incident log display window 1618.

As discussed above, dashboard 1600 may include one or more selection windows for providing inputs to the dashboard. These selection windows may operate similar to the selection windows of dashboard 1500, except for a customer segment. For example, as illustrated in FIG. 16, dashboard 1600 includes customer selection window 1602 and view selection window 1604. Customer selection window 1602 may be used to select which customer to evaluate. In FIG. 16, customer selection window 1602 is shown as a drop-down menu with "Customer 1" selected; however, other types of input controls may be used. View selection window 1604 may be used to focus displayed information with respect to either AIR-O or AIR-OD calculations. In FIG. 16, view selection window 1604 is shown as selectable buttons with "AIR-O" selected; however, other types of input controls may be used. In embodiments, the information displayed in display windows of dashboard 1600 updates as selections are made in the one or more selection windows.

As discussed above, dashboard 1600 may include one or more display windows for displaying interruption rate and incident log data indicative of outage evaluation and insight management associated with selections made in the one or more selection windows. As illustrated in FIG. 16, dashboard 1600 includes interruption display window 1606, average AIR-O display window 1608, average AIR-OD display window 1610, incident display window 1612, region display window 1614, root cause display window 1616, and incident log display window 1618. These display windows may display information and include functions similar to interruption display window 1506, average AIR-O display window 1508, average AIR-OD display window 1510, incident display window 1512, region display window 1514, root cause display window 1516, and incident log display window 1518 of dashboard 1500 as described with respect to 1500, except the display windows of dashboard 1600 are with respect to a customer segment of resources.

Thus, an example reporting dashboard GUI for providing interruption rate and incident log data indicative of outage evaluation and insight management for a customer has been illustrated and described, according to an example embodiment. Dashboard 1600 may include additional selection windows and/or display windows (not shown for brevity and illustrative clarity) in addition to or in place of those shown in FIG. 16. For instance, additional selection windows of dashboard 1600 may include review period selection windows, region selection windows, resource cluster selection windows, and/or the like. Further, additional display windows of dashboard 1600 may include communication plane display windows, monitoring system display windows, responsible service provider tenant display windows, customer display windows, and/or the like.

The example embodiments illustrated and described with respect to FIGS. 14, 15, and 16 show implementations of reporting dashboard GUIs for various applications. In some embodiments, two or more such GUIs are combined into a single interface. For example, dashboard 1400 of FIG. 14 may be configured as a home page reporting dashboard GUI and dashboards 1500 and 1600 may be subcomponents or tabs of dashboard 1400. In one embodiment, dashboards 1500 and/or 1600 are configured as selectable tabs of reporting display window 1418 of dashboard 1400. In another embodiment, dashboards 1400, 1500, and 1600 are web pages of a support website for a service provider (e.g., as part of a company intranet). In some embodiments, additional or alternative dashboards are configured similar to dashboards 1400, 1500, and/or 1600. For instance, a reporting dashboard GUI may be configured to display information related to incidents associated with a region, offering, resource cluster, resource, and/or the like, in embodiments.

IV. Further Example Embodiments and Advantages

As noted above, systems and devices, including MIMSs, may be configured in various ways to intelligently evaluate outages and manage insights. Incidents have been described as associated with outages affecting a cloud computing service, however it is also contemplated herein that incidents may pertain to an end-user issue, an intermediate service issue, an external outage, or the like. Interruptions have been described as a count of resources impacted by an incident; however, it is also contemplated that an interruption may be a contiguous period of time a resource is impacted by an incident. In this case, an incident may include one or more interruptions per resource. The systems and methods described herein are utilized to evaluate outages and manage insights in a cloud computing service.

The systems and devices described herein may evaluate outages to provide actionable insights for reviewing and/or improving reliability in a cloud computing service. For example, systems and devices described herein may evaluate service level offerings, outage metrics, location data, customer usage data, time to mitigate, attribution data, repair metrics, anomalous activity data, communication data, code validation metrics, code coverage metrics, build pipeline metrics, release pipeline metrics, change data, AIR-O values, AIR-OD values, and/or the like to determine actionable insights. An actionable insight is information indicative of degradations and/or failures in the cloud computing service. Actionable insights may indicate hot spots, commonly responsible services, commonly impacted resources, regions most impacted by outages, most common root causes, most impacted customers, most severe incidents, and/or the like. Actionable insights may be used to implement, deploy, and/or enforce a corrective action in the cloud computing service system. Corrective actions may include: prioritizing repairs, creating a repair request/agenda for one or more resources; conducting customer outreach; reducing repeat failures; identifying/informing new and/or potential areas of investment for the service provider; re-establishing baseline provisions; improving reliability in one or more resources; improving software update release workflow; establishing and/or managing an error budget; reducing customer reported incidents; improving code quality; improving customer experience and satisfaction; assigning accountability; ranking root causes; and/or the like.

Methods, systems, and devices for calculating interruption rates and interruption duration rates have been described herein. These rates may be determined for any temporal resolution (e.g., hourly, daily, weekly, monthly, quarterly, annually, and/or the like). For example, AIR-O and AIR-OD calculations have been described as daily resolutions that are scaled to annual rates using a scaling factor (e.g., 365 days per year). In embodiments, trends are evaluated to determine average interruption rates and/or interruption duration rates for a review period. In an example, rolling averages for AIR-O and AIR-OD values may be determined for the last year.

As described herein, interruption rates and/or interruption duration rates may be determined and/or evaluated for one or more segments of resources. In embodiments, these segments correspond to one or more customers, regions, dates, fleets, offerings, resource clusters, and/or the like. Segments may be based on one or more temporal factors, spatial factors, logical factors, and/or the like. By segmenting resources, a service provider may compare interruption rates and/or interruption duration rates between different segments to determine areas within the cloud computing service that need improvement or support.

Further, techniques and embodiments have been described for calculating and evaluating interruption rates and/or interruption duration rates for a plurality of segments of resources. The plurality of segments of resources may be divided based on one or more temporal factors, spatial factors, logical factors, and/or the like, in embodiments. In embodiments, segments of resources are different from each other or overlap with one another. Embodiments of the present disclosure may compare interruption rates and/or interruption duration rates corresponding to different segments of resources to identify hot spots, trends, contributing factors, and/or other related information, as described elsewhere herein or otherwise known.

As described herein, embodiments of MIMSs may display to and interact with GUIs, such as one or more reporting dashboard GUIs. In embodiments, reporting dashboard GUIs provide live and/or historic data for sets of resources managed by a service provider. The reporting dashboards may organize data into various forms, including AIR-O values, AIR-OD values, average AIR-O values, average AIR-OD values, trendlines, hot spots, contributing factors, causal factors, impacted resources, active resources, impacted customers, responsible service teams, actionable insights, and/or the like. In embodiments, this information is evaluated by the MIMS, the service provider, and/or a service team to evaluate changes in quality, evaluate improvements in reliability, identify investment areas, determine problem areas, determine actionable insights, and/or the like. For example, embodiments of monitoring and incident management segments may be used to propose and/or enforce actionable insights, automatically (e.g., via a MIMS), manually (e.g., via a service technician, a service team, or a service provider), or a combination of automatic and manual operations.

As described herein, MIMSs may evaluate activity and data from resources to determine if there is anomalous activity, in embodiments. The anomalous activity may be analyzed in order to determine if it is indicative of an incident and/or outage. For example, a MIMS may determine factors of the anomalous activity pass certain thresholds (e.g., length of time a resource is unresponsive, count of unresponsive resources, time since last version update, or count of customer reported interruptions) or fit certain criteria (e.g., co-located to other resources impacted by an outage, power outage within a geolocation, environmental crisis within a geolocation, or code bug in distributed software update). Once anomalous activity is determined to be an incident and associated with an outage, it is triaged and classified to determine date and time of occurrence, impacted resources, and/or other forms of impact data as described herein or otherwise understood by persons of ordinary skill in the relevant art(s) having the benefit of this disclosure.

Moreover, according to the described embodiments and techniques, any components of MIMSs and their functions may be caused to be activated for operation/performance thereof based on other operations, functions, actions, and/or the like, including initialization, completion, and/or performance of the other operations, functions, actions, and/or the like.

In some example embodiments, one or more of the operations of the flowcharts described herein is not performed. Moreover, operations in addition to or in lieu of the operations of the flowcharts described herein may be performed. Further, in some example embodiments, one or more of the operations of the flowcharts described herein are performed out of order, in an alternate sequence, or partially (or completely) concurrently with each other or with other operations.

The further example embodiments and advantages described in this Section may be applicable to any embodiments disclosed in this Section or in any other Section of this disclosure.

Embodiments and techniques, including methods, described herein may be performed in various ways such as being implemented by hardware, or hardware combined with one or both of software and firmware.

V. Example Computer System Implementations

Computing device(s) 102, MIMS(s) 104, resource sets 116 and 118, network switch 120, network switch 122, servers 124, 126, 128, and 130, incident manager 106, rate manager 108, insight manager 110, system 200, communication interface 202, incident manager 204, rate manager 206, insight manager 208, system monitor 210, incident detector 212, incident classifier 214, incident communicator 216, incident correlator 218, incident filter 220, interruption rate calculator 222, interruption duration rate calculator 224, interruption rate evaluator 226, insight reporter 228, data storage(s) 230, resource identification 232, incident log(s) 234, datacenters 1202 and 1204, resource(s) 1226, resource(s) 1228, resource(s) 1230, resource(s) 1232, data warehouse 1206, service provider system 1208, flowchart 300, flowchart 400, flowchart 500, flowchart 600, flowchart 700, flowchart 800, flowchart 900, diagram 1000, diagram 1100, diagram 1300, dashboard 1400, dashboard 1500, and/or dashboard 1600 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented in a system-on-chip (SoC). The SoC may include an integrated circuit chip that includes one or more of a processor (e.g., a microcontroller, microprocessor, or digital signal processor (DSP)), memory, one or more communication interfaces, and/or further circuits and/or embedded firmware to perform its functions.

Figure 17:
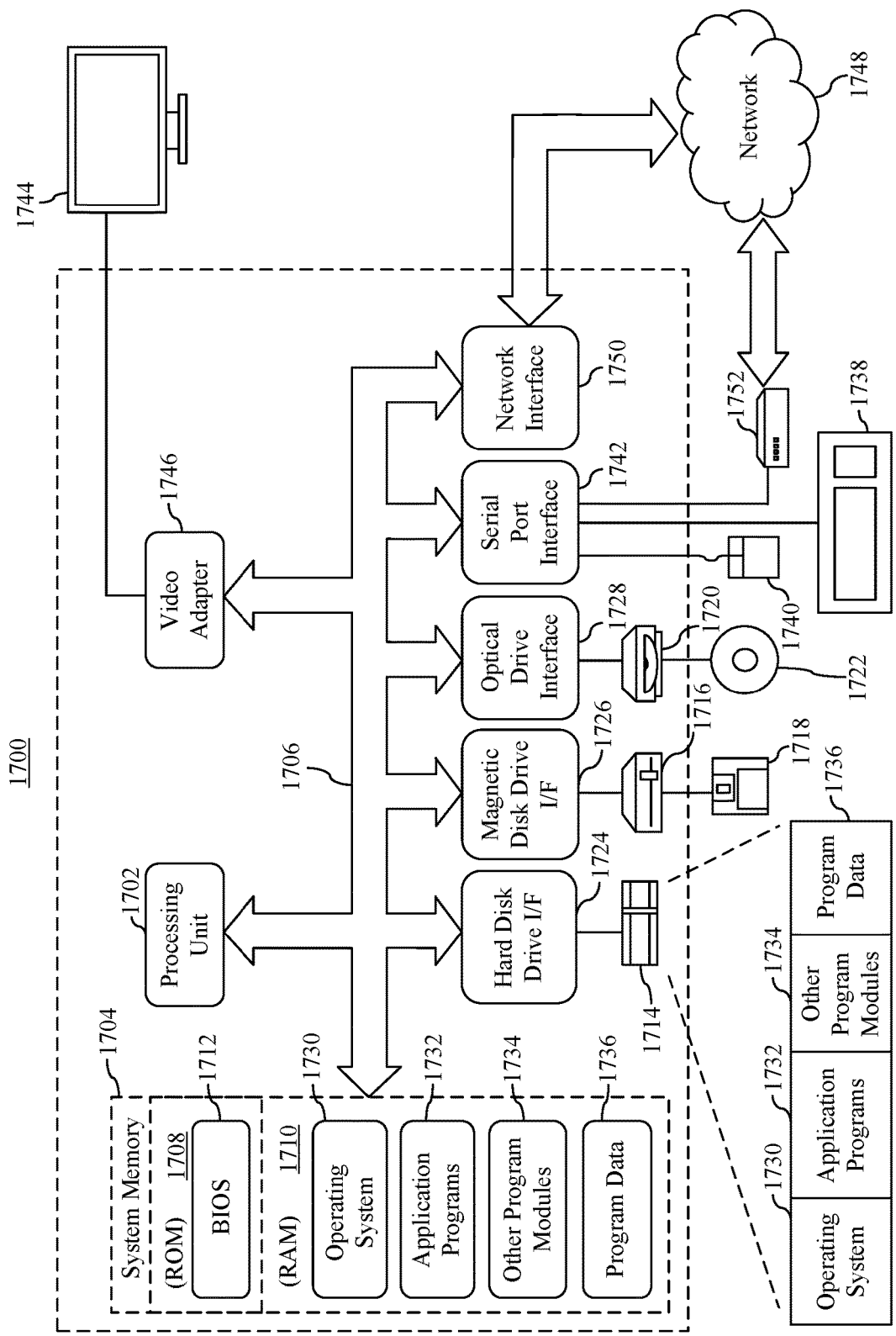
FIG. 17 is a block diagram of an example processor-based computer system that may be used to implement various embodiments.

FIG. 17 depicts an exemplary implementation of a processor-based computer system 1700 ("system 1700" herein) in which embodiments may be implemented. For example, system 1700 may be used to implement computing device(s) 102, MIMS(s) 104, resource sets 116 and 118, and/or servers 124, 126, 128, and 130, as described above in reference to FIG. 1. System 1700 may also be used to implement system 200, as described above in reference to FIG. 2. System 1700 may also be used to implement datacenters 1202 and/1204, resource(s) 1226, resource(s) 1228, resource(s) 1230, resource(s) 1232, system 200, and/or service provider system 1208, as described above in reference to FIG. 12. System 1700 may also be used to implement any of the steps of any of the flowcharts of FIGS. 3-9, as described above. System 1700 may also be used to implement a computing device associated with any of the hierarchies of the diagrams of FIG. 10 or 11 as described above. System 1700 may also be used to implement any measurements, detections, calculations, storage, and/or the like associated with diagram 1300 of FIG. 13. System 1700 may also be used to implement any of the dashboards of FIGS. 14-16. The description of system 1700 provided herein is provided for purposes of illustration, and is not intended to be limiting. Embodiments may be implemented in further types of computer systems, as would be known to persons skilled in the relevant art(s).

As shown in FIG. 17, system 1700 includes one or more processors, referred to as processing unit 1702, a system memory 1704, and a bus 1706 that couples various system components including system memory 1704 to processing unit 1702. Processing unit 1702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processing unit 1702 may execute program code stored in a computer readable medium, such as program code of operating system 1730, application programs 1732, other programs 1734, etc. Bus 1706 represents one or more of any of several types of bus structures, including a memory bus or memory controller, a peripheral bus, an accelerated graphics port, and a processor or local bus using any of a variety of bus architectures. System memory 1704 includes read only memory (ROM) 1708 and random access memory (RAM) 1710. A basic input/output system 1712 (BIOS) is stored in ROM 1708.

System 1700 also has one or more of the following drives: a hard disk drive 1714 for reading from and writing to a hard disk, a magnetic disk drive 1716 for reading from or writing to a removable magnetic disk 1718, and an optical disk drive 1720 for reading from or writing to a removable optical disk 1722 such as a CD ROM, DVD ROM, or other optical media. Hard disk drive 1714, magnetic disk drive 1716, and optical disk drive 1720 are connected to bus 1706 by a hard disk drive interface 1724, a magnetic disk drive interface 1726, and an optical drive interface 1728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards and drives (e.g., solid state drives (SSDs)), digital video disks, RAMs, ROMs, and other hardware storage media.

A number of program modules or components may be stored on the hard disk, magnetic disk, optical disk, ROM, or RAM. These program modules include an operating system 1730, one or more application programs 1732, other program modules 1734, and program data 1736. In accordance with various embodiments, the program modules may include computer program logic that is executable by processing unit 1702 to perform any or all the functions and features of MIMS(s) 104, incident manager 106, rate manager 108, insight manager 110, system 200, communication interface 202, incident manager 204, rate manager 206, insight manager 208, system monitor 210, incident detector 212, incident classifier 214, incident communicator 216, incident correlator 218, incident filter 220, interruption rate calculator 222, interruption duration rate calculator 224, interruption rate evaluator 226, insight reporter 228, service provider system 1208, flowchart 300, flowchart 400, flowchart 500, flowchart 600, flowchart 700, flowchart 800, flowchart 900, diagram 1000, diagram 1100, diagram 1300, dashboard 1400, dashboard 1500, and/or dashboard 1600.

A user may enter commands and information into the system 1700 through input devices such as keyboard 1738 and pointing device 1740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processing unit 1702 through a serial port interface 1742 that is coupled to bus 1706, but may be connected by other interfaces, such as a parallel port, game port, or a universal serial bus (USB).

A display screen 1744 is also connected to bus 1706 via an interface, such as a video adapter 1746. Display screen 1744 may be external to, or incorporated in, system 1700. Display screen 1744 may display information, as well as being a user interface for receiving user commands and/or other information (e.g., by touch, finger gestures, virtual and/or keyboard). For example, display screen 1744 may display dashboard 1400, 1500, and/or 1600. In addition to display screen 1744, system 1700 may include other peripheral output devices (not shown) such as speakers and printers.

System 1700 is connected to a network 1448 (e.g., the Internet) through an adaptor or network interface 1750, a modem 1752, or other means for establishing communications over the network. Modem 1752, which may be internal or external, may be connected to bus 1706 via serial port interface 1742, as shown in FIG. 17, or may be connected to bus 1706 using another interface type, including a parallel interface.

As used herein, the terms "computer program medium," "computer-readable medium," and "computer-readable storage medium" are used to refer to physical hardware media such as the hard disk associated with hard disk drive 1714, removable magnetic disk 1718, removable optical disk 1722, other physical hardware media such as RAMs, ROMS, flash memory cards, digital video disks, zip disks, MEMs, nanotechnology-based storage devices, and further types of physical/tangible hardware storage media. Such computer-readable storage media are distinguished from and non-overlapping with communication media (i.e., do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1732 and other programs 1734) may be stored on the hard disk, magnetic disk, optical disk, ROM, RAM, or other hardware storage medium. Such computer programs may also be received via network interface 1750, serial port interface 1742, or any other interface type. Such computer programs, when executed or loaded by an application, enable system 1700 to implement features of embodiments described herein. Accordingly, such computer programs represent controllers of the system 1700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware. In accordance with various embodiments, the program modules may include computer program logic that is executable by processing unit 1702 to perform any or all of the functions and features of computing device(s) 102, MIMS(s) 104, resource sets 116 and 118, and/or servers 124, 126, 128, and 130 as described above in reference to FIG. 1, system 200 of FIG. 2, and/or datacenter 1202, datacenter 1204, resource(s) 1226, resource(s) 1228, resource(s) 1230, resource(s) 1232, and/or service provider system 1208 as described above in reference to FIG. 12. The program modules may also include computer program logic that, when executed by processing unit 1702, causes processing unit 1702 to perform any of the steps of any of the flowcharts of FIGS. 3-9, as described above.

VI. Additional Exemplary Embodiments

In an embodiment, a computer-implemented method is performed by a cloud computing service provider system. The method includes receiving a set of incident logs associated with a cloud computing service. Each incident log of the set of incident logs includes impact data corresponding to a respective incident that occurred during an evaluation period. The impact data includes an interruption count representative of a number of interruptions on resources caused by the respective incident. A total active resource time representative of resource activity during the evaluation period is determined. An interruption rate for the evaluation period is determined by generating a total interruption count by summing interruption counts of the set of incident logs and dividing the total interruption count by the total active resource time. An actionable insight applicable to the cloud computing service is generated based on the interruption rate and the incident logs.

In an embodiment, the impact data further includes data generated at a checkpoint of a lifecycle of the respective incident.

In an embodiment, the set of incident logs corresponds to a selected segment of resources of a total set of resources associated with the cloud computing service.

In an embodiment, the selected segment of resources is selected from the total set of resources based on at least one of: a temporal factor, a spatial factor, or a logical factor In an embodiment, the measurement indicates a degradation of or a failure of the cloud computing service.

In an embodiment, a corrective action is deployed based on the actionable insight report.

In an embodiment, the interruption rate is compared with another interruption rate that corresponds with a segment of resources of the total set of resources different from the selected segment of resources. A hot spot is determined based on the comparison.

In an embodiment, the actionable insight is generated by analyzing the interruption rate and the set of incident logs to attribute the interruption rate to at least one root cause and determining the actionable insight based on the analyzing.

In an embodiment, the interruption rate is scaled according to a scaling factor representative of a ratio of the evaluation period to a scaled period. A stored scaled interruption rate is received. The stored scaled interruption rate is representative of a previously determined scaled interruption rate with respect to a previous evaluation period. The scaled interruption rate and the stored scaled interruption rate are averaged to generate an average scaled interruption rate.

In an embodiment, a graphical indication associated with the actionable insight is displayed in a user interface.

In an embodiment, a cloud computing service provider system includes a memory that stores program code and a processing system. The processing system includes one or more processors configured to execute the program code. When executed, the program code causes the processing system to receive a set of incident logs associated with a cloud computing service. Each incident log of the set of incident logs includes impact data corresponding to a respective incident that occurred during an evaluation period. The impact data includes an interruption count representative of a number of interruptions on resources caused by the respective incident. The program code further causes the processing system to determine a total active resource time representative of resource activity during the evaluation period. The program code further causes the processing system to determine an interruption rate for the evaluation period by generating a total interruption count by summing interruption counts of the set of incident logs and dividing the total interruption count by the total active resource time. The program code further causes the processing system to generate an actionable insight applicable to the cloud computing service based on the interruption rate and the incident logs.

In an embodiment, the set of incident logs corresponds to a selected segment of resources of a total set of resources associated with the cloud computing service.

In an embodiment, the selected segment of resources is selected from the total set of resources based on at least one of: a temporal factor, a spatial factor, or a logical factor.

In an embodiment, the processing system is further configured to compare the interruption rate with another interruption rate that corresponds with a segment of resources of the total set of resources different from the selected segment of resources and determine a hot spot based on the comparing.

In an embodiment, to generate the actionable insight, the processing system is configured to analyze the interruption rate and the set of incident logs to attribute the interruption rate to at least one responsible service, assign management of the interruption rate to the at least one responsible service, determine the actionable insight based on the analysis and the management assignment.

In an embodiment, a computer-implemented method is performed by a cloud computing service provider system. The computer-implemented method includes receiving a set of incident logs associated with a cloud computing service. Each incident log of the set of incident logs includes impact data corresponding to a respective incident that occurred during an evaluation period. The impact data includes an interruption duration representative of a length of interruptions on resources caused by the respective incident. A total active resource time representative of resource activity during the evaluation period is determined. An interruption duration rate for the evaluation period is determined by generating a total interruption duration by summing interruption durations of the set of incident logs and dividing the total interruption duration by the total active resource time. A actionable insight applicable to the cloud computing service is generated based on the interruption duration rate and the incident logs.

In an embodiment, the set of incident logs corresponds to a selected segment of resources of a total set of resources associated with the cloud computing service.

In an embodiment, the interruption duration rate is compared with another interruption duration rate that corresponds with a segment of resources of the total set of resources different from the selected segment of resources. A hot spot is determined based on said comparing.

In an embodiment, the actionable insight is generated by analyzing the interruption duration rate and the set of incident logs to attribute the interruption duration rate to at least one root cause and determining the actionable insight based on said analyzing.

In an embodiment, the interruption duration rate is scaled according to a scaling factor representative of a ratio of the evaluation period to a scaled period. A stored scaled interruption duration rate is received. The stored scaled interruption duration rate is representative of a previously determined scaled interruption duration rate with respect to a previous evaluation period. The scaled interruption duration rate and the stored scaled interruption duration rate are averaged to generate an average scaled interruption duration rate.

In accordance with an embodiment, any combinations of the above-described embodiments may be utilized depending on the system or method being implemented.

VII. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A computer-implemented method performed by a cloud computing service provider system, comprising:
receiving a set of incident logs corresponding to a selected segment of resources of a total set of resources associated with a cloud computing service, each incident log in the set of incident logs including impact data corresponding to a respective incident that occurred during an evaluation period, the impact data including an interruption count representative of a number of interruptions that have occurred on the selected segment of resources;
determining a total active resource time representative of resource activity associated with the selected segment of resources during the evaluation period;
determining an interruption rate for the evaluation period by:
generating a total interruption count by summing interruption counts included in the impact data of each incident log in the set of incident logs, and
dividing the total interruption count by the total active resource time;

generating an actionable insight applicable to the cloud computing service based on the interruption rate;

comparing the interruption rate with another interruption rate that corresponds to a segment of resources of the total set of resources different from the selected segment of resources;

prioritizing an area within the selected segment of resources for at least one corrective action based on the comparing and the actionable insight; and automatically implementing the at least one corrective action, wherein the at least one corrective action comprises at least one of repairing the selected segment of resources, re-establishing baseline provisions for the selected segment of resources, or releasing a software update to the selected segment of resources.

2. The computer-implemented method of claim 1, wherein the impact data is generated at a checkpoint of a lifecycle of the respective incident.

3. The computer-implemented method of claim 1, wherein the selected segment of resources is selected from the total set of resources based on at least one of:
a temporal factor;
a spatial factor; or
a logical factor.

4. The computer-implemented method of claim 1, wherein the actionable insight includes information associated with a degradation or failure in the cloud computing service.

5. The computer-implemented method of claim 1, wherein generating the actionable insight comprises:
analyzing the interruption rate and the set of incident logs to attribute the interruption rate to a root cause; and
determining the actionable insight based on the analyzing.

6. The computer-implemented method of claim 1, further comprising:
scaling the interruption rate according to a scaling factor representative of a ratio of the evaluation period to a scaled period;
receiving a stored scaled interruption rate representative of a previously determined scaled interruption rate with respect to a previous evaluation period; and
averaging the scaled interruption rate and the stored scaled interruption rate to generate an average scaled interruption rate.

7. The computer-implemented method of claim 1, further comprising:
displaying a graphical indication associated with the actionable insight in a user interface.

8. A cloud computing service provider system, comprising:
a memory that stores program code;
a processing system, comprising a processor, configured to execute the program code that, when executed, causes the processing system to:
receive a set of incident logs corresponding to a selected segment of resources of a total set of resources associated with a cloud computing service, each incident log in the set of incident logs including impact data corresponding to a respective incident that occurred during an evaluation period, the impact data including an interruption count representative of a number of interruptions that have occurred on the selected segment of resources;
determine a total active resource time representative of resource activity associated with the selected segment of resources during the evaluation period;
determine an interruption rate for the evaluation period by:
generating a total interruption count by summing interruption counts included in the impact data of each incident log in the set of incident logs, and dividing the total interruption count by the total active resource time;
generate an actionable insight applicable to the cloud computing service based on the interruption rate;
compare the interruption rate with another interruption rate that corresponds to a segment of resources of the total set of resources different from the selected segment of resources;
prioritize an area within the selected segment of resources for at least one corrective action based on the comparing and the actionable insight; and
automatically implement the at least one corrective action, wherein the at least one corrective action comprises at least one of repairing the selected segment of resources, re-establishing baseline provisions for the selected segment of resources, or releasing a software update to the selected segment of resources.

9. The cloud computing service provider system of claim 8, wherein the selected segment of resources is selected from the total set of resources based on at least one of:
a temporal factor;
a spatial factor; or
a logical factor.

10. The cloud computing service provider system of claim 8, wherein to generate the actionable insight, the processing system is configured to:
analyze the interruption rate and the set of incident logs to attribute the interruption rate to a responsible service;
assign management of the interruption rate to the responsible service; and
determine the actionable insight based on the analyzing and the assigning.

11. A computer-implemented method performed by a cloud computing service provider system, comprising:
receiving a set of incident logs corresponding to a selected segment of resources of a total set of resources associated with a cloud computing service, each incident log in the set of incident logs including impact data corresponding to a respective incident that occurred during an evaluation period, the impact data including an interruption duration representative of a length of interruptions that have occurred on the selected segment of resources;
determining a total active resource time representative of resource activity associated with the selected segment of resources during the evaluation period;
determining an interruption duration rate for the evaluation period by:
generating a total interruption duration by summing interruption durations included in the impact data of each incident log in the set of incident logs, and dividing the total interruption duration by the total active resource time;
generating an actionable insight applicable to the cloud computing service based on the interruption duration rate;
comparing the interruption duration rate with another interruption duration rate that corresponds to a segment of resources of the total set of resources different from the selected segment of resources;

prioritizing an area within the selected segment of resources for at least one corrective action based on the comparing and the actionable insight; and automatically implementing the at least one corrective action, wherein the at least one corrective action comprises at least one of repairing the selected segment of resources, re-establishing baseline provisions for the selected segment of resources, or releasing a software update to the selected segment of resources.

12. The computer-implemented method of claim 11, wherein generating the actionable insight comprises:

analyzing the interruption duration rate and the set of incident logs to attribute the interruption duration rate to a root cause; and determining the actionable insight based on the analyzing.

13. The computer-implemented method of claim 11, further comprising:

scaling the interruption duration rate according to a scaling factor representative of a ratio of the evaluation period to a scaled period;

receiving a stored scaled interruption duration rate representative of a previously determined scaled interruption duration rate with respect to a previous evaluation period; and averaging the scaled interruption duration rate and the stored scaled interruption duration rate to generate an average scaled interruption duration rate.

* * * * *